US011171955B2

(12) United States Patent
Shanbhogue et al.

(10) Patent No.: US 11,171,955 B2
(45) Date of Patent: Nov. 9, 2021

(54) LINK PROTECTION FOR TRUSTED INPUT/OUTPUT DEVICES

(71) Applicant: Intel Corporation, Santa Clara, CA (US)

(72) Inventors: Vedvyas Shanbhogue, Austin, TX (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 16/298,588

(22) Filed: Mar. 11, 2019

(65) Prior Publication Data

US 2020/0296099 A1    Sep. 17, 2020

(51) Int. Cl.
*H04L 29/06* (2006.01)
*G06F 21/60* (2013.01)
*H04L 9/08* (2006.01)

(52) U.S. Cl.
CPC ........ *H04L 63/0876* (2013.01); *G06F 21/602* (2013.01); *H04L 9/0877* (2013.01); *H04L 63/162* (2013.01)

(58) Field of Classification Search
CPC . H04L 63/0876; H04L 63/162; H04L 9/0877; H04L 9/087706; H04L 9/43; H04L 9/3236
See application file for complete search history.

(56) References Cited

U.S. PATENT DOCUMENTS

| 2008/0130881 | A1* | 6/2008 | You ................. H04L 9/0637 380/46 |
| 2010/0098249 | A1* | 4/2010 | Shin ................. H04L 9/0872 380/44 |
| 2016/0188889 | A1  | 6/2016 | Narendra et al. |
| 2016/0321458 | A1* | 11/2016 | Zhang ................. H04L 9/12 |

OTHER PUBLICATIONS

European Search Report and Search Opinion, EP App. No 20156157.8, dated Jun. 24, 2020, 7 pages.

* cited by examiner

*Primary Examiner* — Hee K Song
(74) *Attorney, Agent, or Firm* — Nicholson De Vos Webster & Elliott LLP

(57) ABSTRACT

A system on a chip (SoC) includes memory, a processor coupled to the memory, and link protection circuitry coupled to the memory and the processor. The link protection circuitry includes an SoC encryption engine to receive first data from the memory and a first key, generate, by an SoC encryption counter of the SoC encryption engine, an SoC encryption counter value, encrypt the first data using the SoC encryption counter value and the first key to generate first encrypted data, and cause the first encrypted data to be transmitted to a device including a device decryption counter synchronized with the SoC encryption counter.

18 Claims, 15 Drawing Sheets

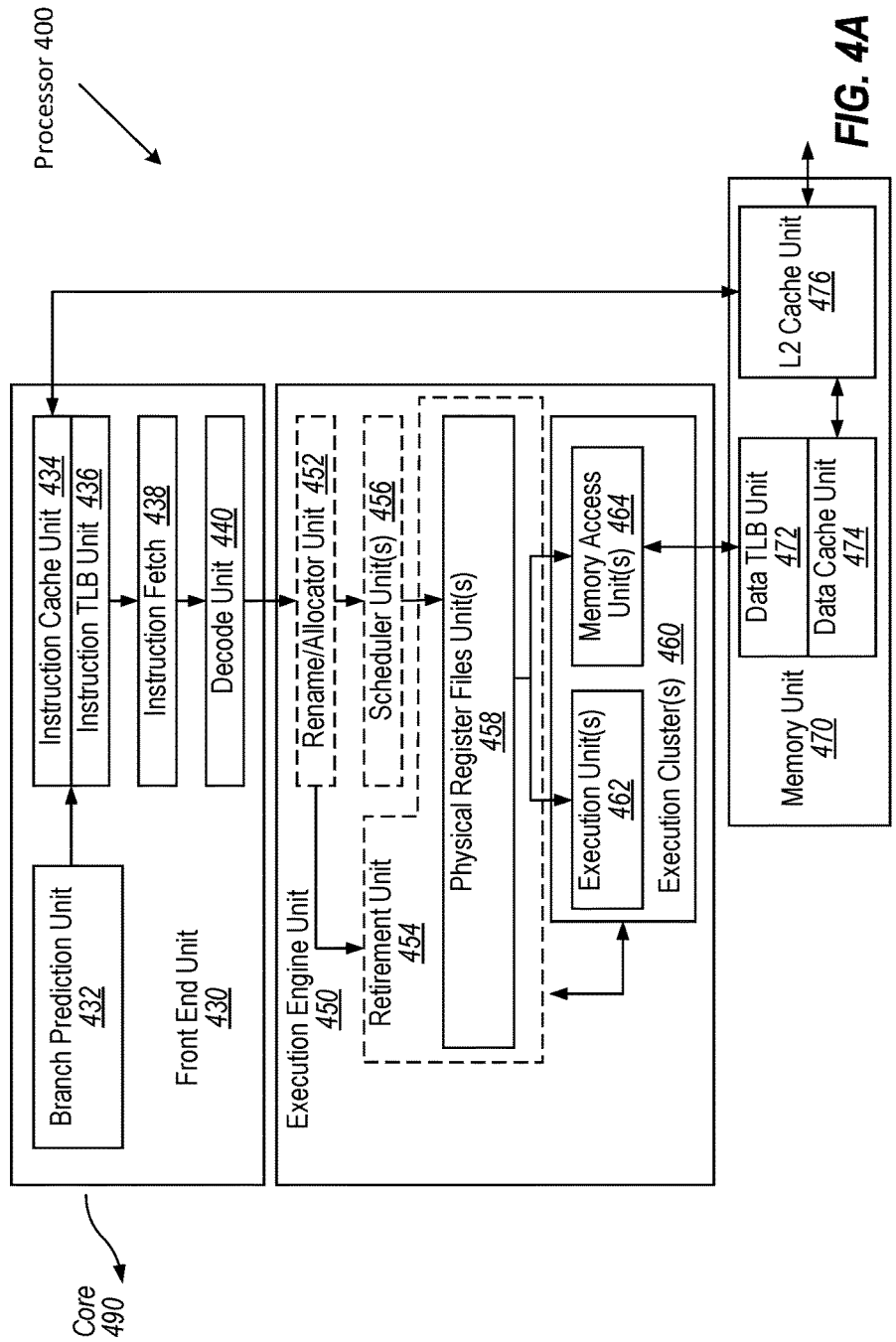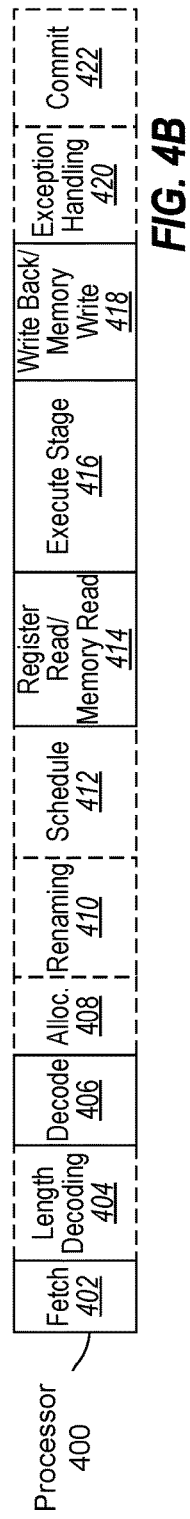

US 11,171,955 B2

LINK PROTECTION FOR TRUSTED INPUT/OUTPUT DEVICES

TECHNICAL FIELD

Embodiments of the disclosure relate generally to link protection for input/output devices.

BACKGROUND

Data may be transmitted and received via intermediate nodes. For example, a system on a chip (SoC) may transmit data to an accelerator device via an intermediate node, such as a switch or a bridge. The transmission and receipt of the data is to be protected from malicious actions such as, for example, unauthorized reading, unauthorized writing, and write drops.

BRIEF DESCRIPTION OF THE DRAWINGS

FIG. 4A is a block diagram illustrating a micro-architecture for a processor, according to one embodiment.

FIG. 4B is a block diagram illustrating an in-order pipeline and a register renaming stage, out-of-order issue/execution pipeline according to an embodiment of the disclosure.

DESCRIPTION OF THE EMBODIMENTS

Figure 1A:
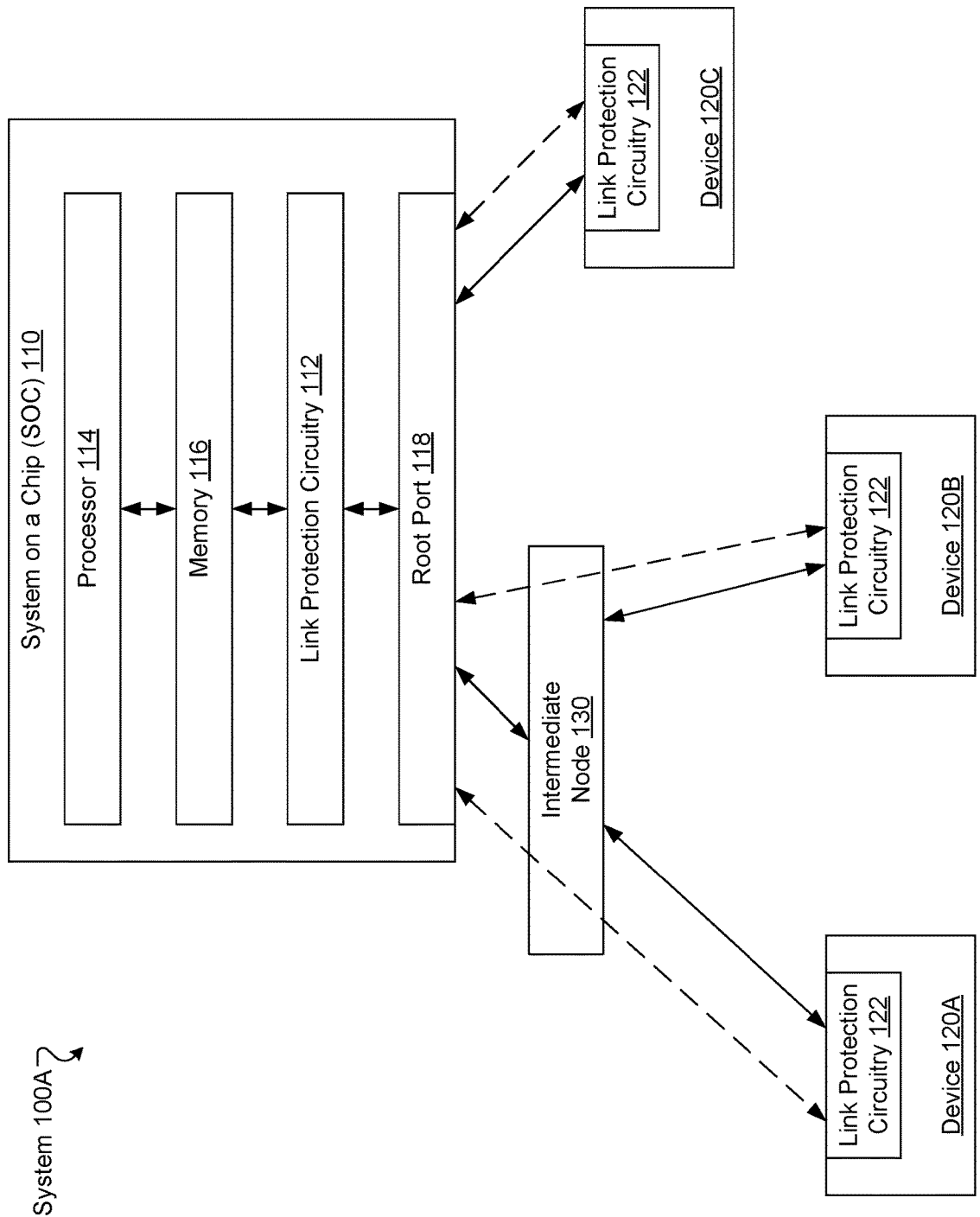
FIG. 1A illustrates a system including a system on a chip (SoC), devices, and an intermediate node, according to certain embodiments.

Described herein are technologies directed to link protection for trusted input/output (IO) devices. A trusted IO device may refer to a system on a chip (SoC) or device (e.g., accelerator) that is to be part of a trusted environment, where transmission of data is to be protected. For example, a SoC may be part of a trusted environment, such as a trusted execution environment (TEE) and the SoC may be communicably coupled to one or more devices (e.g., IO devices, accelerators, memory device, etc.) that provide additional functionalities. The SoC may be directly coupled to the devices or may be coupled to the devices via one or more intermediate nodes (e.g., switch, bridge, etc.). Conventionally, to secure data communication, data may be associated with a keyed hash or message authentication code (MAC) generated at the transmitter (e.g., SoC) (e.g., a key may be used to generate the MAC at the transmitter) and verified at the receiver (e.g., device) (e.g., the key may be used to verify the MAC at the receiver). The keyed hash or MAC is used to protect the data between the transmitter and the receiver. Conventionally, the intermediate nodes may see data in plain text which may cause security concerns if the intermediate nodes are not part of the trusted computing base (TCB).

To secure transmission of data between the SoC and a device via an intermediate node, security may be verified at each segment of the transmission (e.g., SoC to intermediate node, intermediate node to device, etc.). This approach may be referred to as providing link protection (e.g., segment protection) on a link-to-link (L2L) basis, where integrity of the data is to be verified at each hop (e.g., intermediate node) along the path to the destination (e.g., accelerator, etc.). Under L2L, each segment (e.g., SoC to intermediate node, intermediate node to device, etc.) along the transmission is protected with its own key. For example, the SoC may include an encryption engine to encrypt data using a first key, the intermediate node may include a decryption engine to decrypt the encrypted data with the first key and an encryption engine to encrypt the data with a second key, and a device may include a decryption engine to decrypt the encrypted data from the intermediate node with the second key. Each intermediate node may decrypt data with one key and then encrypt the data with another key.

To implement L2L secure transmission, each intermediate node is to have cryptographic hardware (e.g., endpoints of each link are to have cryptographic hardware). Cryptographic hardware may include a decryption engine to decrypt encrypted data that is received and an encryption engine to re-encrypt the decrypted data for transmission. Cryptographic hardware takes up extra area, has extra power consumption (e.g., even while idle due to static leak of power), provides extra latency due to decrypting and re-encrypting the data received, etc. The increased latency and power consumption is added at each intermediate node from source to destination, which may cause the transmission latency and platform power consumption to greatly increase.

The devices, systems, and methods, as described herein provide link protection (e.g., end-to-end (E2E) protection) for trusted IO devices. A first device (e.g., SoC, trusted IO device) that is to transmit data may have first link protection circuitry. Cryptographic primitives may include encryption and authentication. Encryption may provide confidentiality and authentication may provide data integrity. A MAC may be used for authentication. The two cryptographic primitives may use a first key (e.g., a secret key). The first link protection circuitry may include an encryption engine to receive first data (e.g., read request, write request, completion packet) to be transmitted and a first key. The encryption engine may include an encryption counter that is to generate an encryption counter value. The encryption engine may encrypt the first data using the encryption counter value and the first key to generate first encrypted data (e.g., the encryption engine may generate ciphertext of the data along with a MAC to be transmitted using the first key). The first device may transmit (e.g., via a root port, via a transmitter) the first encrypted data to a second device (e.g., device, SoC). In implementations of the disclosure, the first device may transmit the first encrypted data to the second device via an intermediate node without having the intermediate node verify integrity of the encrypted data at the intermediate node. Instead, the first encrypted data is to be decrypted by a decryption engine (e.g., of second link protection circuitry) of the second device using the first key and a decryption counter value (e.g., generated by a decryption counter of the decryption engine) that is synchronized with the encryption counter value.

The first device and the second device (e.g., transmitting device and receiving device, SoC and device, etc.) may each have link protection circuitry that uses keys and counters to provide E2E protection (e.g., link protection on an endpoint to endpoint basis). E2E protection may provide protection for data transfer without reliance on intermediate nodes and without intermediate nodes verifying integrity of the data (e.g., agnostic of topology of the path, not using intermediate nodes in the trust boundary like L2L uses, cryptographic work can be done off the critical path). In some embodiments, the only entities participating in the protection are the two endpoints (e.g., device and SoC for memory accesses). In some embodiments, for device-to-device communication, there may be two devices and the SoC involved in securing the communication over links (e.g., first device sends to SoC via E2E protection and the SoC sends to second device via E2E protection). E2E protection may be added to links independently without relying on manufacturers of intermediate nodes (e.g., switch and bridge manufacturers) to provide such protection.

The E2E protection may be provided without changes to the communication protocol (e.g., peripheral component interconnect express (PCIe®) protocol, Intel® Accelerator Link (IAL) protocol, high speed interface protocol, etc.). For example, PCIe® specification allows selection of whether to allow re-ordering of read and write requests or to restrict ordering of read and write requests. Re-ordering read and write requests can result in the counters becoming out-of-synchronization between the transmitter and receiver. E2E protection may work without changing the base PCIe® protocol as restricting ordering is allowed by the PCIe® specification. In some embodiments, to avoid errors and provide functional correctness, one pair of counters (for each class of requests) may be used for generating trusted requests, which are identified by a new trusted IO transaction layer packet (TLP) header that may carry attributes of trusted IO requests (e.g., SoC, intermediate nodes, devices, etc. are to maintain order of data that has a trusted IO TLP header). The trusted IO TLP header may have two bits, one bit to indicate whether data is encrypted or not and another bit which indicates if the data is part of the E2E protection. If the data is encrypted but not encrypted with E2E protection, the data may be encrypted with another type of protection (e.g., L2L protection). Multiple link encryption schemes may be supported on the same platform.

The E2E protection of implementations of the disclosure may reduce the overall platform cost for supporting a link encryption solution by reducing the number of cryptographic engines and operations for securing data transmitted to/from an endpoint. Intermediate nodes may not have cryptographic engines under E2E protection. Thus, the area, power, and latency overheads of transmitting and receiving data using E2E protection may be reduced significantly compared to conventional L2L protection solutions.

E2E protection may be used for IO protection with TEEs, such as trust domain extensions (TDX), to enable trusted transmission of data at lower area and performance overheads. TDX refers to instruction set architecture (ISA) extensions that provide confidentiality (and integrity) for customer (tenant) software executing in an untrusted cloud service provider (CSP) infrastructure. The TDX architecture, which can be a SoC capability, provides isolation between trusted domain (TD) workloads and CSP software, such as a virtual machine manager (VMM) of the CSP. Components of the TDX architecture may include 1) memory encryption engine, 2) a resource management capability referred to as the trust domain resource manager (TDRM) (e.g., a TDRM may be a software extension of the Virtual Machine Monitor (VMM)), and 3) secure encryption key management capabilities provided via a set of micro-architectural tables, a set of instructions, and central processing unit (CPU) access-controlled TD control structures. The TDX architecture provides an ability of the processor to deploy TDs that leverage the memory encryption engine, the secure key management operations, and the access-controlled TD control structures for secure operation of TD workloads.

FIG. 1A illustrates a system 100 including SoC 110, devices 120, and an intermediate node 130, according to certain embodiments. The SoC 110 may include link protection circuitry 112 and each device 120 may include link protection circuitry 122. In some embodiments, link protection circuitry 112 and each link protection circuitry 122 have similar or equivalent functionality. In some embodiments, link protection circuitry 112 and each link protection circuitry 122 has similar or equivalent hardware, firmware, and/or software. The link protection circuitry 112 and 122 are described in further detail in FIGS. 1B and 2A-C.

Although the description herein may refer to transmission and receipt of data between SoC 110 and a device 120 (e.g., via an intermediate node 130), the transmission and receipt of data may be between two devices 120, where the two devices 120 are the same, similar, or different types of devices. In some embodiments, the transmission and receipt of data may be between two devices 120 via an intermediate node 130. For example, device 120A may transmit data to intermediate node 130 and intermediate node 130 may transmit the data to device 120B (e.g., without SoC 110 receiving the data). In some embodiments, the transmission and receipt of data may be between two devices 120, the SoC 110, and optionally one or more intermediate nodes 130. For example, device 120A may transmit data to SoC 110 via intermediate node 130 and the SoC 110 may transmit the data to device 120C. In some embodiments, the transmission and receipt of data may be between two SoCs 110, where the two SoCs 110 are the same, similar, or different types of SoCs.

The SoC 110 may further include a processor 114 (e.g., processor core), memory 116, and a root port 118. The SoC 110 may include one or more additional components, such as input-output memory management unit (IOMMU) circuitry, fill buffers, etc. (see FIG. 1B). The SoC 110 may be an integrated circuit. In some embodiments, each of the components of the SoC 110 may be disposed on the same substrate. In some embodiments, the components of the SoC 110 may be disposed on two or more substrates. In some embodiments, one or more of the root port 118, memory 116, or processor 114 may be part of the link protection circuitry. In some embodiments, the processor 114, memory 116, link protection circuitry 112, and root port 118 are distinct components. In some embodiments, two or more of the processor 114, memory 116, link protection circuitry 112, or root port 118 may be integral to each other. For example, the link protection circuitry 112 may be included as an integrated block in the processor 114.

Each device 120 may include one or more additional components, such as store buffers, load buffers, device memory, a processor, a root port, transmitter, receiver, etc. (see FIG. 1B). Devices 120 may be one or more of an IO device, accelerator device (e.g., programmable acceleration card (PAC), graphics accelerator), network card (e.g., integrated network card), memory (e.g., memory device, dynamic random-access memory (DRAM)), graphics card, field-programmable gate array (FPGA), integrated circuit (IC), a processor, an additional SoC, etc. Device 120 may provide one or more additional functionalities to SoC (e.g., to accelerate processing, etc.). A device 120 may be a discrete device (e.g., not on the same substrate as the SoC 110) or may be an integrated device (e.g., on the same substrate as the SoC). A device 120 may provide additional functionalities to SoC 110 (e.g., where the additional functionalities would not fit on the same substrate as the SoC 110).

Intermediate node 130 may be one or more of a hub, bridge, switch, router, etc. In some embodiments, the intermediate node 130 (e.g., hub) may transmit data received (e.g., without filtering) to all connected devices (e.g., SoC 110, devices 120). In some embodiments, the intermediate node 130 (e.g., bridge) may connect a first local network to a second local network that uses the same protocol and may filter traffic (e.g., identify the destination of data before forwarding the data). In some embodiments, the intermediate node (e.g., switch) may have multiple ports and may perform error checking before forwarding data. In some embodiments, the intermediate node 130 (e.g., router) may forward data based on address (e.g., IP address to allow sending data over different network protocols).

In some embodiments, the intermediate node 130 (e.g., router) forwards data based on software executing on the intermediate node 130. In some embodiments, the intermediate node 130 (e.g., switch) forwards data based on hardware (e.g., Application Specific Integrated Circuits (ASIC)). In some embodiments, the intermediate node 130 forwards data based on firmware of the intermediate node 130. In some embodiments, the intermediate node forwards data on a combination of two or more of software, hardware, or firmware. In some embodiments, two or more intermediate nodes 130 (e.g., same type, different types) are located between SoC 110 and a device 120.

The SoC 110 and devices 120 may transmit data to each other (e.g., via one or more intermediate nodes 130) over an interconnect according to a PCIe® protocol, e.g., in accordance with the PCI Express® Specification Base Specification version 3.0 (published Jan. 17, 2007), or another such protocol such as a serial data input/output (SDIO) standard. Connection between SoC 110 and devices 120 may be configured on one or more add-in cards or can be by way of connectors adapted to a motherboard. In some embodiments, SoC 110 and devices 120 transmit data to each other (e.g., via one or more intermediate nodes 130) via one or more physical interconnects. In some embodiments, SoC 110 and devices 120 transmit data to each other (e.g., via one or more intermediate nodes 130) via one or more wireless interconnects. In some embodiments, SoC 110 and devices 120 transmit data to each other using a wireless local area network (WLAN) unit, Wi-Fi® communications in accordance with a given Institute of Electrical and Electronics Engineers (IEEE) 802.11 standard. In some embodiments, SoC 110 and devices 120 transmit data to each other via a unit using the Bluetooth® technology, short range communications via a Bluetooth® protocol. In another embodiment, SoC 110 and devices 120 may communicate via a USB link or a universal asynchronous receiver transmitter (UART) link.

SoC 110 and device 120A may transmit data to each other via an intermediate node 130. SoC 110 and device 120B may transmit data to each other via the same intermediate node 130. SoC 110 and device 120C may transmit data to each other directly without any intermediate nodes 130. In some embodiments, responsive to the intermediate node 130 receiving data from the SoC 110, the intermediate node 130 may transmit the data only to device 120A. In some embodiments, responsive to the intermediate node 130 receiving data from the SoC 110, the intermediate node 130 may transmit the data to both device 120A and device 120B (e.g., transmit the same data to both devices). In some embodiments, responsive to the intermediate node 130 receiving data from the SoC 110, the intermediate node 130 may transmit a first portion of the data (e.g., data identified as to be transmitted to device 120A) to device 120A and a second portion of the data (e.g., data identified as to be transmitted to device 120B, different from the first portion of the data) to device 120B.

In some embodiments, SoC 110 may transmit and receive data via multiple intermediate nodes 130 (e.g., receive data from device 120A via a first intermediate node and receive data from device 120B via a second intermediate node). In some embodiments, SoC 110 may transmit data to and receive data from a device 120 via multiple intermediate nodes 130 (e.g., SoC 110 transmits data to a first intermediate node, the first intermediate node transmits the data to a second intermediate node, and the second intermediate node transmits the data to a device 120).

In FIG. 1A, the arrows with solid lines may indicate the route of the data (e.g., from SoC 110 to intermediate node 130 and from intermediate node 130 to device 120A) and the arrows with dashed lines may illustrate the secure route (e.g., arrow heads indicating which devices encrypt and/or decrypt the data). For example, data may be transmitted between SoC 110 and device 120A via intermediate node 130 and only SoC 110 and device 120A may encrypt or decrypt the data (e.g., intermediate node 130 does not encrypt or decrypt the data).

Each link protection circuitry 112 and 122 may encrypt data to be transmitted and/or may decrypt data received. Each link protection circuitry 112 and 122 may protect the integrity of data to be transmitted and may verify integrity of data received. By the SoC 110 and each of the devices 120 having link protection circuitry 112 or 122, data may be securely transmitted and received without verification of the security of the data by any intervening intermediate nodes 130.

Figure 1B:
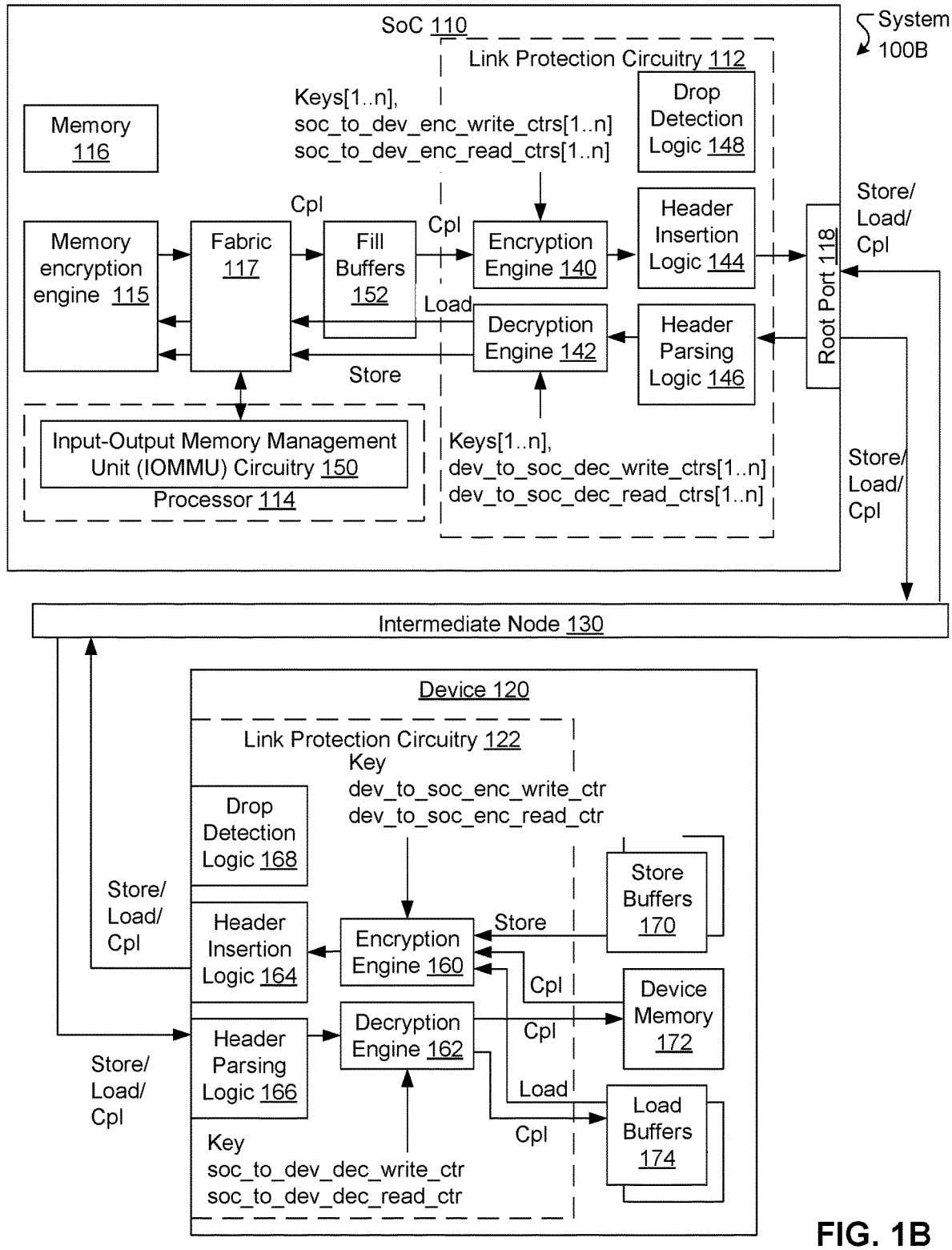
FIG. 1B illustrates a system including an SoC, a device, and an intermediate node, according to certain embodiments.
Figure 1C:
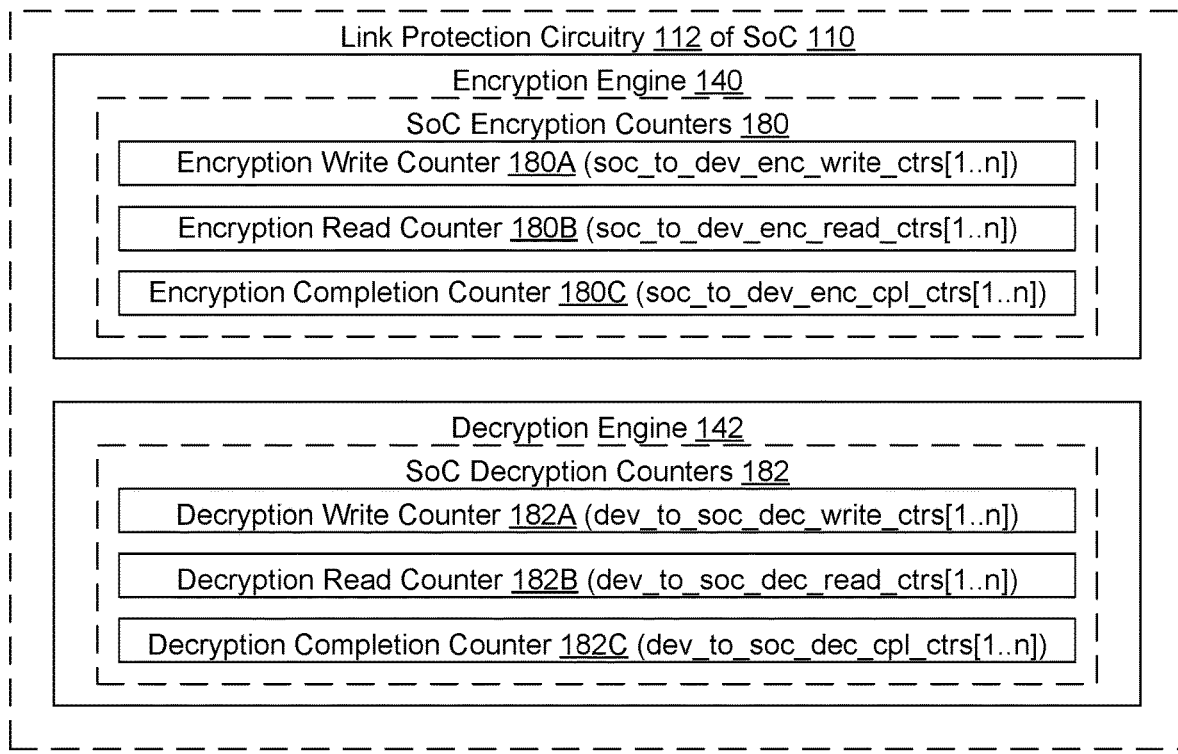
FIG. 1C illustrates link protection circuitry of an SoC, according to certain embodiments.
Figure 1D:
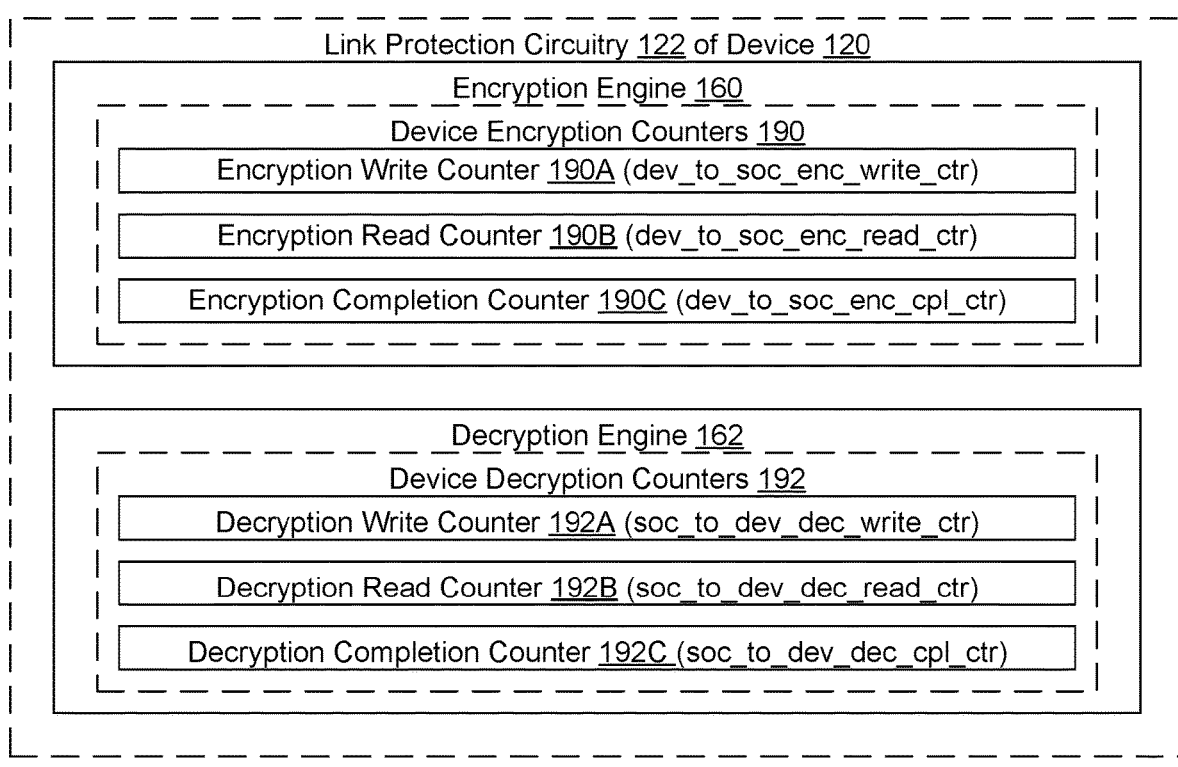
FIG. 1D illustrates link protection circuitry of a device, according to certain embodiments.

FIG. 1B illustrates a system including SoC 110, a device 120, and an intermediate node 130, according to certain embodiments. FIG. 1C illustrates counters of link protection circuitry 112 of SoC 110. FIG. 1D illustrates counters of link protection circuitry 122 of device 122. Components in FIGS. 1B-D with the same or similar reference numbers as those in FIG. 1A may have the same or similar functionalities as those in FIG. 1A.

The SoC 110 may have a memory 116 that is coupled to a processor 114 (e.g., processor core). The SoC 110 may have a memory encryption engine 115 (e.g., multi-key total memory encryption (MKTME) engine). The memory encryption engine 115 may sit on the fabric 117 (e.g. memory fabric) in the SoC 110 and may connect to memory (e.g., memory outside the SoC 110, memory 116). The memory encryption engine 115 may be coupled to one or more of the memory 116 or the processor 114. The link protection circuitry 112 may be used to protect transmission of data between the SoC 110 and device 120 and the memory encryption engine 115 may be used to protect the data within the SoC 110. The SoC may include fabric 117 coupled to the memory encryption engine 115, input-output memory management unit (IOMMU) circuitry 150, fill buffers 152, and link protection circuitry 112. In some embodiments, the processor 114 may include a processor core and the IOMMU circuitry 150. In some embodiments, the processor 114 may include the link protection circuitry 112.

The link protection circuitry 112 of SoC 110 may be coupled to the fill buffers 152, fabric 117, and root port 118. In some embodiments, the link protection circuitry 112 may include the fill buffers 152, fabric 117, and/or root port 118. The link protection circuitry 112 may include an encryption engine 140 (e.g., SoC encryption engine), decryption engine 142 (e.g., SoC decryption engine), header insertion logic 144, header parsing logic 146, and drop detection logic 148. The link protection circuitry 112 of SoC 110 may use a different set of keys and a different set of counters for each device 120.

The device 120 may include store buffers 170, device memory 172, and load buffers 174. The device 120 may include link protection circuitry 122 that is coupled to the store buffers 170, device memory 172, and load buffers 174. In some embodiments, the link protection circuitry 122 may include the store buffers 170, device memory 172, and/or load buffers 174. The link protection circuitry 122 may include encryption engine 160 (e.g., device encryption engine), decryption engine 162 (device decryption engine), header insertion logic 164, header parsing logic 166, and drop detection logic 168. In some embodiments, the device 120 has one set of counters and one set of keys (e.g., one encryption key and one decryption key) for all data received and transmitted by the device 120 (e.g., shared between multiple trusted sessions). In some embodiments, the device 120 uses multiple sets of counters and multiple sets of keys. For example, a device 120 implementing network and storage capabilities can use a first set of counters and keys for network functionality and second set of counters and keys for storage functionality.

The encryption engine 140 of the SoC 110 may receive data (e.g., write request, read request, completion packet) from fabric 117 and a key (e.g., from a register of the SoC, from a flop of the SoC) and may generate, by SoC encryption counter 180 of the encryption engine 140, SoC encryption counter value. The encryption engine 140 may encrypt the data using the SoC encryption counter value and the key to generate encrypted data and may cause the encrypted data to be transmitted to device 120. The decryption engine 162 of the device 120 may receive the encrypted data from the SoC 110, may receive the key (e.g., from a register of the device 120, from a flop of the device 120), and may generate, by a device decryption counter 192 (e.g., that is synchronized with the SoC encryption counter 180 during cryptographic session startup by the link protection circuitry 112 and link protection circuitry 122 being initialized to the same value and then being incremented with each transaction) of the decryption engine 162, a device decryption counter value. The decryption engine 162 may decrypt the encrypted data using the device decryption counter value and the key to generate decrypted data.

The encryption engine 160 of the device 120 may receive data (e.g., write request, read request, completion packet) from device memory 172 (e.g., a completion packet), store buffers 170 (e.g., write request), or load buffers 174 (e.g., read request) and a key (e.g., from a register of the device 120, from a flop of the device 120) and may generate, by a device encryption counter 190 of the encryption engine 160, a device encryption counter value. The encryption engine 160 may encrypt the data using the device encryption counter value and the key to generate encrypted data and may cause the encrypted data to be transmitted to SoC 110. The decryption engine 142 of the SoC 110 may receive the encrypted data from the device 120, may receive the key (e.g., from a register of the SoC 110, from a flop of the SoC 110), and may generate, by an SoC decryption counter 182 (e.g., that is synchronized with the device encryption counter 190 during cryptographic session startup by the link protection circuitry 112 and link protection circuitry 122 communicating with each other the synchronized counter values) of the decryption engine 142, a SoC decryption counter value. The decryption engine 142 may decrypt the encrypted data using the SoC decryption counter value and the key to generate decrypted data.

In some embodiments, the SoC encryption counters 180 include encryption write counter 180A and encryption read counter 180B. The encryption engine 140 of SoC 110 may receive keys 1-$n$, SoC-to-device encryption write counter values 1-$n$ (e.g., SoC encryption write counter values via one or more encryption write counters 180A of the encryption engine 140), and SoC-to-device encryption read counter values 1-$n$ (e.g., SoC encryption read counter values via one or more encryption read counters 180B of the encryption engine 140). In some embodiments, the SoC decryption counters 182 include decryption write counter 182A, decryption read counter 182B, and/or decryption completion counter 182C. The decryption engine 142 may receive keys 1-$n$, device-to-SoC decryption write counter values 1-$n$ (e.g., SoC decryption write counter values via one or more decryption write counters 182A of the decryption engine 142), and device-to-SoC decryption read counter values 1-$n$ (e.g., SoC decryption read counter values via one or more decryption read counters 182B of the decryption engine 142). Each of 1-$n$ may correspond to a different device 120. For example, key 1 and counter value 1 may be used between SoC 110 and device 120A, key 2 and counter value 2 may be used between SoC 110 and device 120B, etc. In some embodiments, each SoC encryption counter 180 and each SoC decryption counter 182 includes a different counter for each device (e.g., a first encryption write counter 180A for communication between SoC 110 and device 120A, a second encryption write counter 180A for communication between SoC 110 and device 120B, etc.). Each packet (e.g., encrypted data with trusted IO TLP header) received by the SoC 110 may have an identifier that identifies from which device 120 the packet was transmitted. The SoC 110 may select the corresponding key and counter value based on the identifier.

In some embodiments, the device encryption counters 190 include encryption write counter 190A and encryption read counter 190B. The encryption engine 160 of device 120 may receive key, device-to-SoC encryption write counter value (e.g., device encryption write counter value via encryption write counter 192A of the encryption engine 160), and device-to-SoC encryption read counter value (e.g., device encryption read counter value via encryption read counter 190B of the encryption engine 160). In some embodiments, the device decryption counters 192 include decryption write counter 192A, decryption read counter 192B, and/or decryption completion counter 192C. The decryption engine 162 may receive key, SoC-to-device decryption write counter value (e.g., device decryption write counter value via decryption write counters 192A of the decryption engine 162), and SoC-to-device decryption read counter value (e.g., device decryption read counter value via decryption read counter 192B of the decryption engine 162).

In some embodiments, the encryption engine 160 of the device 120 may receive a read request (e.g., load) from load buffers 174. The encryption engine 160 may select a key and a device encryption read counter 190B (e.g., of the encryption engine 160). The encryption engine 160 may encrypt the read request using the selected key and device encryption read counter value. The header insertion logic 164 may receive the encrypted read request and may generate a trusted IO TLP header (e.g., indicating the order of the encrypted read request is to be maintained in view of other encrypted read requests). Responsive to generating the trusted IO TLP header, the device 120 may transmit (e.g., via a transmitter) the encrypted read request (e.g., load) to the SoC 110 (e.g., via one or more intermediate nodes 130). The root port 118 of the SoC 110 may receive the encrypted read request. The header parsing logic 146 may parse the trusted IO TLP header to verify integrity of the data. The decryption engine 142 may determine that the next device decryption read counter value of a device decryption read counter 190B of the decryption engine 142 (e.g., that is synchronized with the encryption read counter 180B of the encryption engine 160 of the device 120) and the same key are to be used to decrypt the encrypted read request. The decryption engine 142 may decrypt the encrypted read request (using the key and the decryption read counter value). Fill buffer 152 may temporarily hold a response to a read request from the device 120 from system memory (e.g., memory 116). Once the response is received from memory in fill buffers 152, the response may be transmitted back to the device 120 as the completion (e.g., completion packet) of the original read request.

The fabric 117 may transmit a completion packet (e.g., read response in response to the read request) to the fill buffer 152 and the fill buffer 152 (e.g., upon the fill buffer 152 becoming full) may transmit the completion packet to the encryption engine 140. The encryption engine 140 may encrypt the completion packet using SoC encryption counter 180 (e.g., encryption completion counter 180C) and a key and may transmit the encrypted completion packet to the header insertion logic 144. The header insertion logic 144 may generate a trusted IO TLP header for the encrypted completion packet and may provide the encrypted completion packet and trusted IO TLP header to the root port 118. The root port 118 may provide the encrypted completion packet and trusted IO TLP header to the header parsing logic 166 (e.g., via one or more intermediate nodes 130). The trusted IO TLP header is to be observed by the intermediate nodes 130 (e.g., the intermediate nodes 130 are to determine that the intermediate nodes 130 are not to re-order the data). The two endpoints may receive or transmit the transaction and use the corresponding counter to encrypt or decrypt and to generate or verify integrity. The header parsing logic 166 may parse the trusted IO TLP header to verify integrity of the data. The header parsing logic 166 may provide the encrypted completion packet to the decryption engine 162. The decryption engine 162 may decrypt the encrypted completion packet using the same key (as the encryption engine 140 used) and a device decryption counter value (of the device decryption counter 192 (decryption completion counter 192C) that is synchronized with the SoC encryption counter 180 (encryption completion counter 180C) that was used to encrypt the completion packet). The decryption engine 162 may provide the completion packet to the device memory 172 and/or the load buffer 174.

The encryption engine 160 may receive a write request (e.g., store) from the store buffers 170. The store buffers 170 may receive the write request from processing logic (e.g., processor, microcontroller, software, firmware, etc.) of the device 120. The link protection circuitry 122 may encrypt and provide a trusted IO TLP header to the write request similar to encrypting and providing a header to a read request (except that a device encryption write request is used). The root port 118 and link protection circuitry 112 may receive and process the encrypted write request similar to how the encrypted read request is received and processed by the root port 118 and link protection circuitry 112. The decryption engine 142 may provide the write request to the fabric 117. In some embodiments, a completion packet (e.g., a write response) may be provided in response to the write request from the SoC 110 to the device 120 in a similar manner as the completion packet is provided in response to the read request.

FIG. 1B displays transmitting read and write requests from the device 120 to the SoC 110 and transmitting completion packets from the SoC to the device 120. Device 120A may transmit read and write requests and completion packets to a second device 120B and the second device 120B may transmit read and write requests and completion packets to the device 120A. Device 120 may transmit read and write requests and completion packets to multiple recipients (e.g., SoC 110 and devices 120) and may receive read and write requests and completion packets from multiple recipients. SoC 110 may transmit read and write requests and completion packets to one or more devices 120 and may receive read and write requests and completion packets from one or more devices 120. A second SoC may transmit read request and write requests to SoC 110 and the SoC 110 may transmit completion packets to the second SoC.

The counters (e.g., read and write counters) of the link protection circuitry 112 and 122 may be implemented in one or more of hardware (e.g., flops), firmware, software, etc. The keys used by the link protection circuitry 112 and 122 may be implemented in one or more of hardware (e.g., registers, flops), firmware, software, etc.

The encryption engines 140 and 160 may perform authenticated counter mode encryption (e.g., via advanced encryption standard-Galois/counter mode (AES-GCM) algorithm or other authenticated encryption modes) for link encryption. For authenticated encryption, the cryptographic work can be decoupled from the data itself allowing for improved performance by associating a counter with each data block (e.g., read request, write request, completion packet, etc.) that is to be encrypted or decrypted. The counter value may be used (e.g., encrypted) to generate a cryptographic pad and the cryptographic pad may be used for encrypting and/or decrypting. Since the counter value is known before data arrives, the cryptographic pad can be pre-computed and stored in buffers ready to be used when data that is to be encrypted or decrypted is received.

The device-to-SoC encryption write counter (e.g., encryption write counter 190A, dev_to_soc_enc_write_ctr) and device-to-SoC decryption write counters[i] (e.g., decryption write counter 182A, dev_to_soc_dec_write_ctr) may be 96 bits each, may be initialized at crypto session setup for each session i, and may be counter input to AES-GCM authenticated encryption for write requests (e.g., store requests) and completion packets (e.g., completions) to SoC 110 from a device 120.

The device-to-SoC encryption read counter (e.g., encryption read counter 190B, dev_to_soc_enc_read_ctr) and device-to-SoC decryption read counters[i] (e.g., decryption read counter 182B, dev_to_soc_dec_read_ctr) may be 96 bits each, may be initialized at crypto session setup for each session i, and may be counter input to AES-GCM authenticated encryption for load request (e.g., read request) to SoC 110 from a device 120B.

The SoC-to-device encryption write counter (e.g., encryption write counter 180A) and SoC-to-device decryption write counters[i] (e.g., decryption write counter 192A) may be 96 bits each, may be initialized at crypto session setup for each session i, and may be counter input to AES-GCM authenticated encryption for store (e.g., write request) and completions (e.g., completion packet) from SoC 110 to a device 120.

The SoC-to-device encryption read counter (e.g., encryption read counter 180B) and SoC-to-device decryption read counters[i] (e.g., decryption read counter 192B) may be 96 bits each, may be initialized at crypto session setup for each session i, and may be counter input to AES-GCM authenticated encryption for load request (e.g., read request) from SoC 110 to device 120.

The header insertion logic 144 and 164 may provide a trusted IO TLP header to carry attributes of a trusted transaction. The trusted IO TLP header may indicate that a transaction is part of a trusted IO session and can carry other cryptographic attributes (e.g., based on being encrypted using a counter value and key). The header parsing logic 146 and 166 may parse the trusted IO TLP header to determine the attributes of the trusted transaction (e.g., to verify integrity of the data). Responsive to the link protection circuitry 112 or 122 (via header parsing logic 146 or 166) determining that the encrypted data has a trusted IO TLP header, the link protection circuitry may verify integrity of the data. Under E2E protection, there may not be any changes to core PCIe® ordering rules. The re-ordering of transactions may be an optional aspect of the specification and the E2E protection may have the intermediate nodes 130 not re-order data (e.g., read requests, write requests, competition packets) with the trusted IO TLP header from the same requester.

In some embodiments, the link layer creates the trusted IO TLP header, the transaction layer inserts the trusted IO TLP layer, and the physical layer transmits the trusted IO TLP header with the encrypted or decrypted data. In some embodiments, the transaction layer creates the trusted IO TLP layer and the link layer and/or physical layer may transmit the trusted IO TLP header with the encrypted or decrypted data.

Responsive to the read and write requests being decoupled, a dropped write request (e.g., by an attacker) may not be detected unless there are subsequent write requests from the requestor (e.g., SoC 110 or device 120). A write request may be dropped and a subsequent read request receives stale data (e.g., responsive to the number of read requests being more than the number of write requests). To detect and/or prevent dropped write requests, SoC 110 may include drop detection logic 148 and/or device 120 may include drop detection logic 168.

In some embodiments, the drop detection logic 148 and/or 168 may generate a special write cycle (e.g., ping write request) after every N reads and then read using a special read (e.g., ping read request). The ping write request writes to a predetermined location (e.g., the 8b register) in the target with a predetermined value (e.g., the initiator chose value) and the ping read returns the value of the predetermined location (e.g., value of the 8b register). If an interposer on the link drops a write request, the drop detection logic 148 and/or 168 would catch the dropped write request. In some embodiments, there is a ping write request every write request. In some embodiments, the ping write request is transmitted less often to reduce bandwidth requirements. In some embodiments, the frequency of ping write requests transmitted by the drop detection logic 148 and/or 168 is based on one or more of available bandwidth, write requests transmitted, etc.

A read request may push all write requests sent before the read request. In some embodiments, the drop detection logic 148 and/or 168 of the initiator may maintain a counter that is incremented on each write request sent and is reset to zero when a read request is sent. The read request may sample the counter value before clearing the counter value. On the receiver, the counter of the corresponding drop detection logic 148 and/or 168 increments on each write request and decrements by the value carried in the read request. If the counter ever becomes negative on a read, a dropped write attack is detected and the session dies.

In one example, there are no dropped writes. There are three write requests and the subsequent read request reads the value of three and then clears the value to zero. Then, for each subsequent read request (without any intervening write requests), the read request reads the value of 0 and clears the value to zero. This may be displayed as (read from right to left for the order of requests):

R(0)R(0)R(0)R(3)WWW--→R(0-0)R(0-0)R(0-0)R(3-3)W(3)W(2)W(1); OK

In another example, there is one write that is dropped or deferred causing the link to die. There is a first write request which increments the count to 1 and then a second write request that increments the count to 2. The read request carries a value of 3 (a write request was dropped reflected in a value one larger than the value of write requests transmitted), so the read request decrements the value from 2 by 3, which results in a negative number. Responsive to the negative number, a dropped write attack is detected and the session dies. This may be displayed as (read from right to left for the order of the requests):

R(0)R(0)R(0)R(3)WWW--→R(2-3)W(2)W(1); link dies

In another example, a write request may pass a read request which is okay. In one embodiment, a first write request may increment the count to 1, a second write request increments the count to 2, a third write request increments the count to 3, a first read request decrements the value of 3 by 3, a fourth write request increments the count to one, a second read request decrements the count of 1 by 1, a fourth read request resets the value to zero. In another embodiment, a first write request may increment the count to 1, a second write request increments the count to 2, a third write request increments the count to 3, a fourth write request increments the count to 4, a first read request decrements the value of 4 by 3, a second read request decrements the count of 1 by 1, a fourth read request resets the value to zero. This may be displayed as (read from right to left for the order of the requests):

R(0)R(1)WR(0)R(3)WWW--→R(0-0)R(1-1)R(1-0)R(4-3)W(4)W(3)W(2)W(1); write request passed read request, but OK The size of the counter in the drop detection logic 148 and/or 168 may be limited by using the same counter to generate ping write and read requests to detect dropped write requests and to increment and decrement to detect dropped write requests.

In some embodiments, the SoC 110 is coupled to device 120 via an intermediate node 130. In some embodiments, the SoC 110 is coupled to device 120 via two or more intermediate nodes 130. In some embodiments, the SoC 110 is coupled to device 120 directly without any intermediate nodes 130.

Figure 2A:
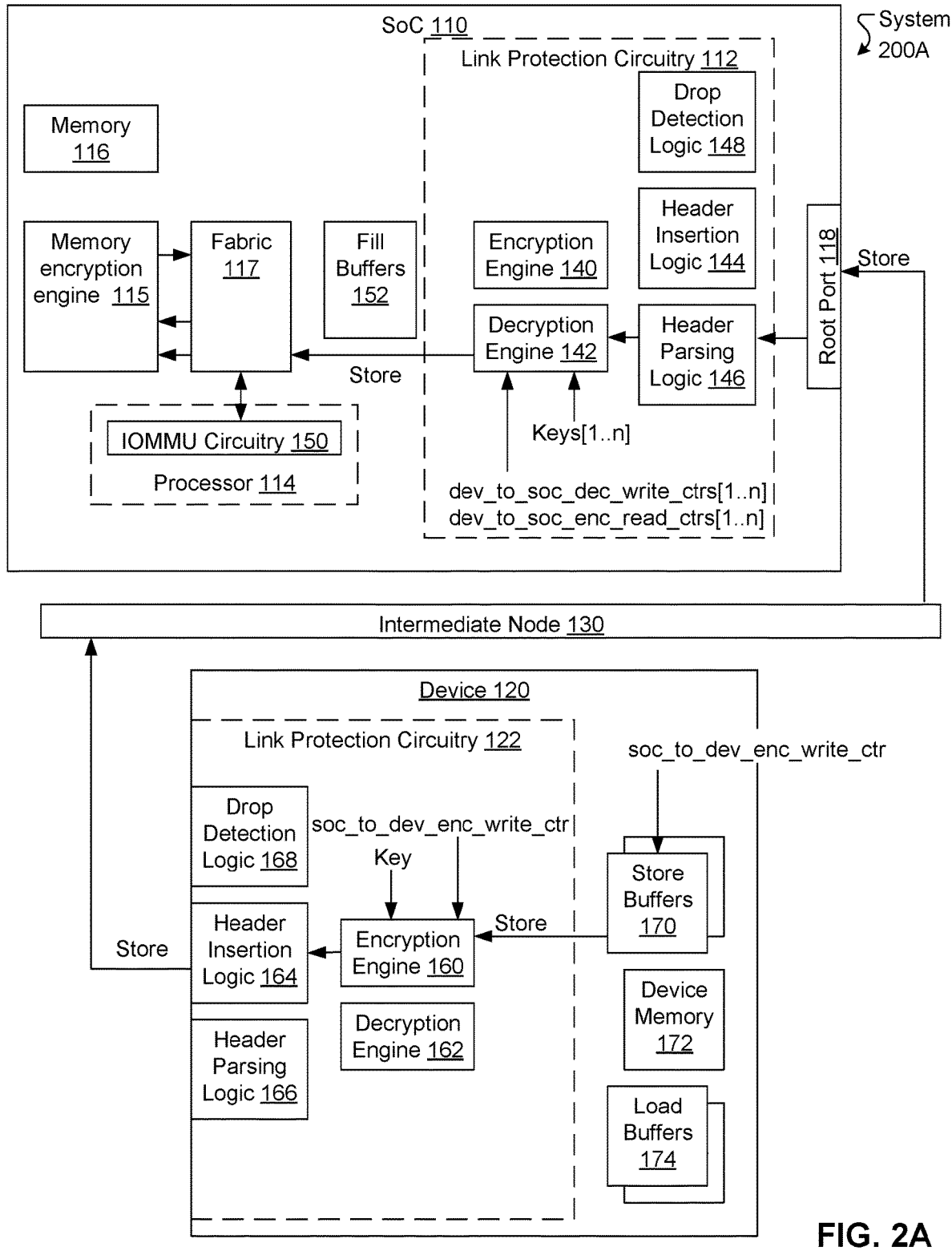
FIGS. 2A-C illustrate systems including an SoC, a device, and an intermediate node, according to certain embodiments.
Figure 2B:
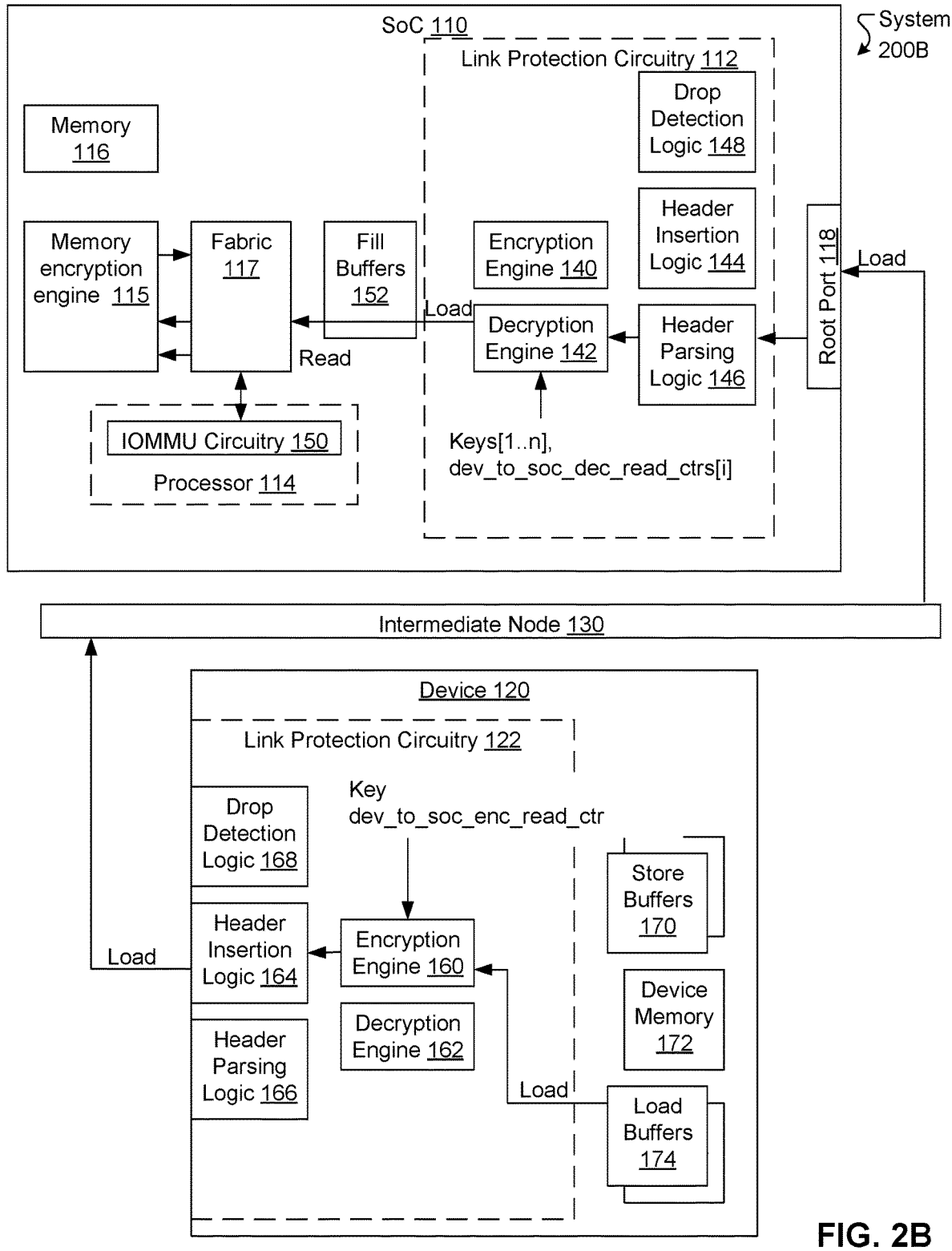
Figure 2C:
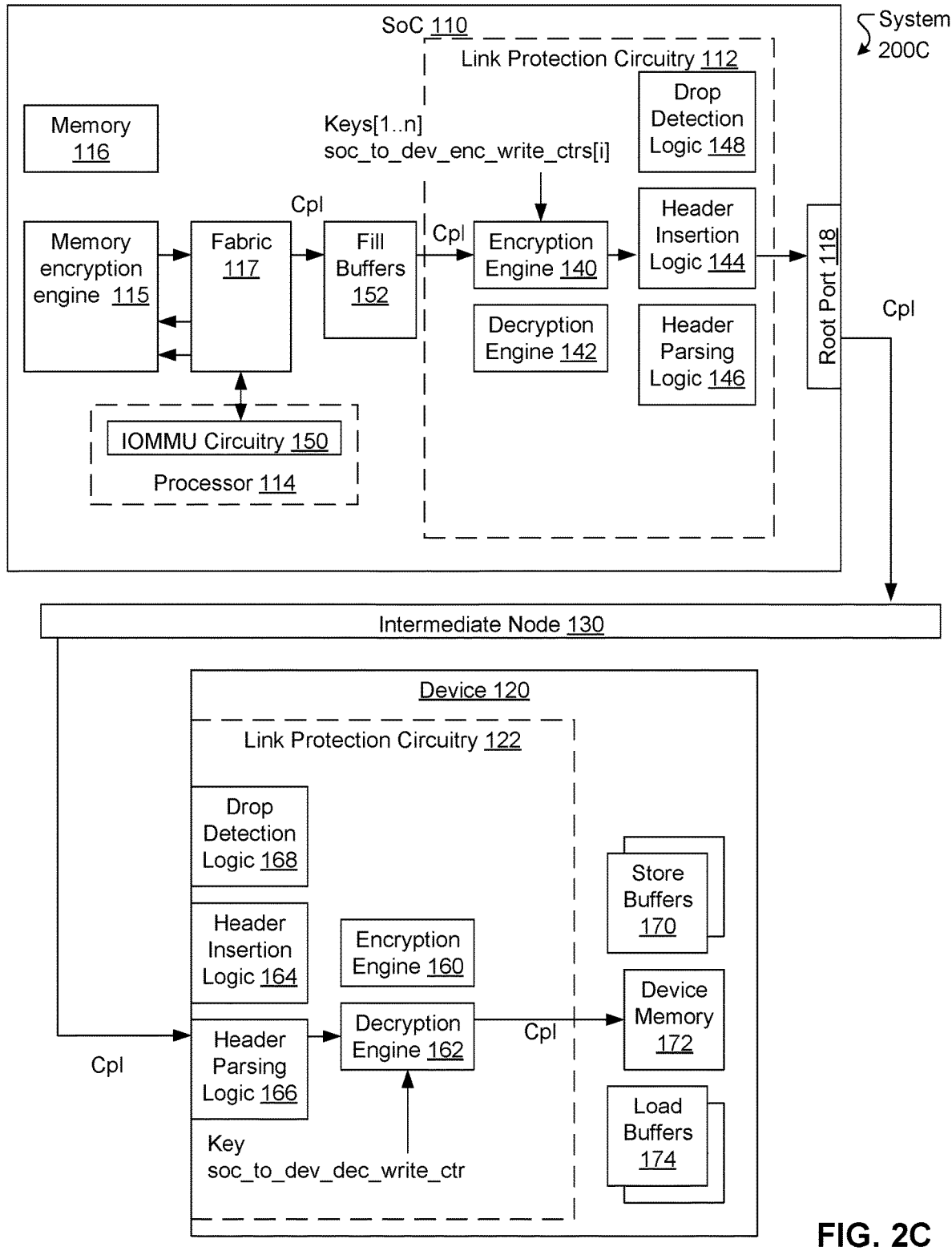

Data transmitted and received between SoC 110 and device 120 may be one or more of a read request, a write request, or a completion packet. FIGS. 2A-C illustrate examples of transmitting and receiving data between SoC 110 and device 120 (e.g., under E2E protection).

With E2E protection, the SoC 110 is to maintain state (e.g., counters) for each session with a device 120 (e.g., a physical device, virtual function, or an interface). The maximum number of trusted IO sessions that can be supported simultaneously may be limited. For example, in some embodiments, up to 128 sessions may be supported. In some embodiments, keys may be setup during attestation phase of the device from the TEE. In some embodiments, the counters of the SoC 110 and device 120 are to be synchronized during a cryptographic session setup for each session.

FIGS. 2A-C illustrate systems including SoC 110, a device 120, and an intermediate node 130, according to certain embodiments. Although FIGS. 2A-C may illustrate flow of one type of data from device 120 to SoC 110 or from SoC 110 to device 120, it is understood that flow can be in the opposite direction, between two devices 120, between two SoCs 110, from a device 120A to a SoC 110 to a device 120B, etc.

FIG. 2A illustrates an example flow for a write request (e.g., device to SoC store request (build)) from device 120 to SoC 110 in system 200A, according to certain embodiments.

The store buffer 170 of the device 120 may sample and increment the device-to-SoC encryption write counter 190A (dev_to_soc_enc_write_ctr) and send a write request (e.g., store request, store payload) to the encryption engine 160 of the device 120.

The sampled counter value (device-to-SoC encryption write counter value from encryption write counter 190A) may be used by the encryption engine 160 to generate the initialization vector (e.g., IV) for encryption (e.g., for encrypting the write request) and generate a MAC over the trusted IO TLP header and payload (e.g., write request). Once the encrypted write request along with the MAC are available, they are sent by the device 120 with the trusted IO TLP header to indicate a trusted IO transaction. The MAC may be carried as part of the trusted IO TLP header. The one or more intermediate nodes 130 (if any) along the path to the SoC 110 cause the write requests from the same requestor with the trusted IO TLP header not to be re-ordered.

Upon receiving the encrypted data, the decryption engine 142 of the SoC 110 samples and increments (to prepare for the next write request) the device-to-SoC write decryption counter 182A (e.g., dev_to_soc_dec_write_ctrs[i]) to obtain the counter value to decrypt and to authenticate the write request. The decrypted store is sent to the fabric 117. From that point, the write request may be protected by the memory encryption engine 115. While flow indicates the counters as being sampled only when a write request is received, in some embodiments, cryptographic pads can be generated using the counters and may be stored on the device 120 and SoC 110 side to minimize the overheads of encryption and decryption.

Device-to-SoC decryption write counter 182A (e.g., dev_to_soc_dec_write_ctrs[i]) and device-to-SoC encryption write counter 190A (e.g., dev_to_soc_enc_write_ctr) may be 96 bits each, may be initialized at crypto session setup for each session i, and may be counter input to AES-GCM authenticated encryption for writing (e.g., storing) to SOC 110.

FIG. 2B illustrates an example flow for a read request (e.g., device to SoC load request (build)) from device 120 to SoC 110 in system 200B, according to certain embodiments.

The load buffer 174 of device 120 may generate a load (e.g., read request) and samples and increments the device-to-SoC encryption read counter 190B (dev_to_soc_enc_read_ctr). The encryption engine 160 uses the device-to-SoC read counter value to generate an IV to encrypt the read request and generate a MAC over the trusted IO TLP header and payload (e.g., read request). A trusted IO TLP header is used to carry the MAC and send the read request to the SoC 110. The SoC 110 uses the corresponding counter (device-to-SoC decryption read counter 182B (e.g., dev_to_soc_dec_read_ctr[i])) to decrypt and authenticate the request. The SoC 110 also opens a fill buffer 152 for the read request to track the response from fabric 117. The SoC sends one or many cache line sized requests to the fabric 117.

Device-to-SoC encryption read counter 190B (e.g., dev_to_soc_enc_read_ctr) may be 96 bits, may be initialized at session setup, may be sent with a read request (e.g., load request) to the SoC 110, and may be counter input to AES-GCM authenticated encryption for rad request to SOC 110. The SoC 110 may use the counter value carried in the read request for decryption of the read request.

FIG. 2C illustrates an example flow for a completion packet from the SoC to device 120 in system 200C, according to certain embodiments. The completion packet may be a response from memory 116 (e.g., DRAM) that is routed through fabric 117 to the device 120 for the original read request from FIG. 2B (e.g., device to SoC load request (build)).

The SoC 110 may collect the read data from fabric 117 in the fill buffer 152 allocated for the read request (of FIG. 2B). Once the fill buffer is filled, a completion packet is sent to the encryption engine 140. The encryption engine 140 uses the SoC-to-device encryption write counter 180A or SoC-to-device encryption completion counter 180C to generate the IV for the completion and to integrally protect it (e.g., by generating a MAC) (e.g., encrypt the completion packet with the SoC-to-device encryption write counter 180A or SoC-to-device encryption completion counter 180C). The SoC 110 transmits the encrypted completion packet (e.g., encrypted response) along with the MAC, using a trusted IO TLP header, to the device 120. The device 120 uses the SoC-to-device decryption write counter 192A or SoC-to-device decryption completion counter 192C (e.g., soc_to_dev_dec_write_ctr) to decrypt and authenticate the completion packet. The transaction identifier (ID) is used to determine the load buffer request that is completing.

Figure 3A:
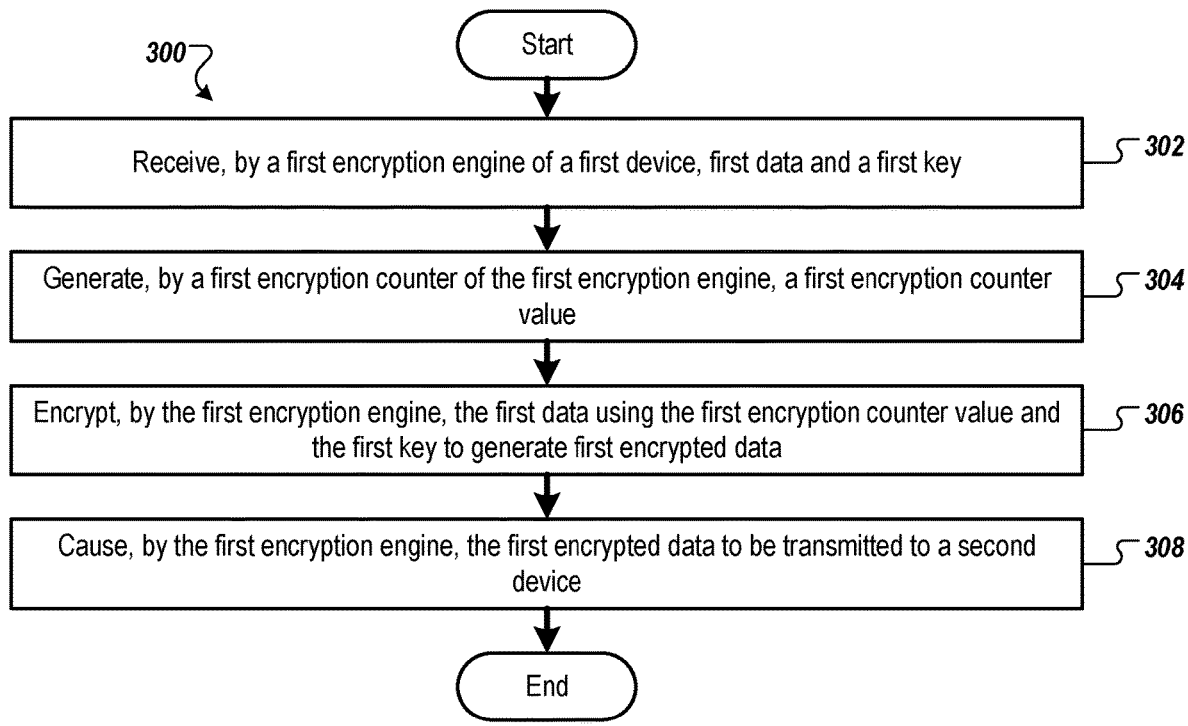
FIGS. 3A-3B are flow diagram of methods of link protection, according to certain embodiments.
Figure 3B:
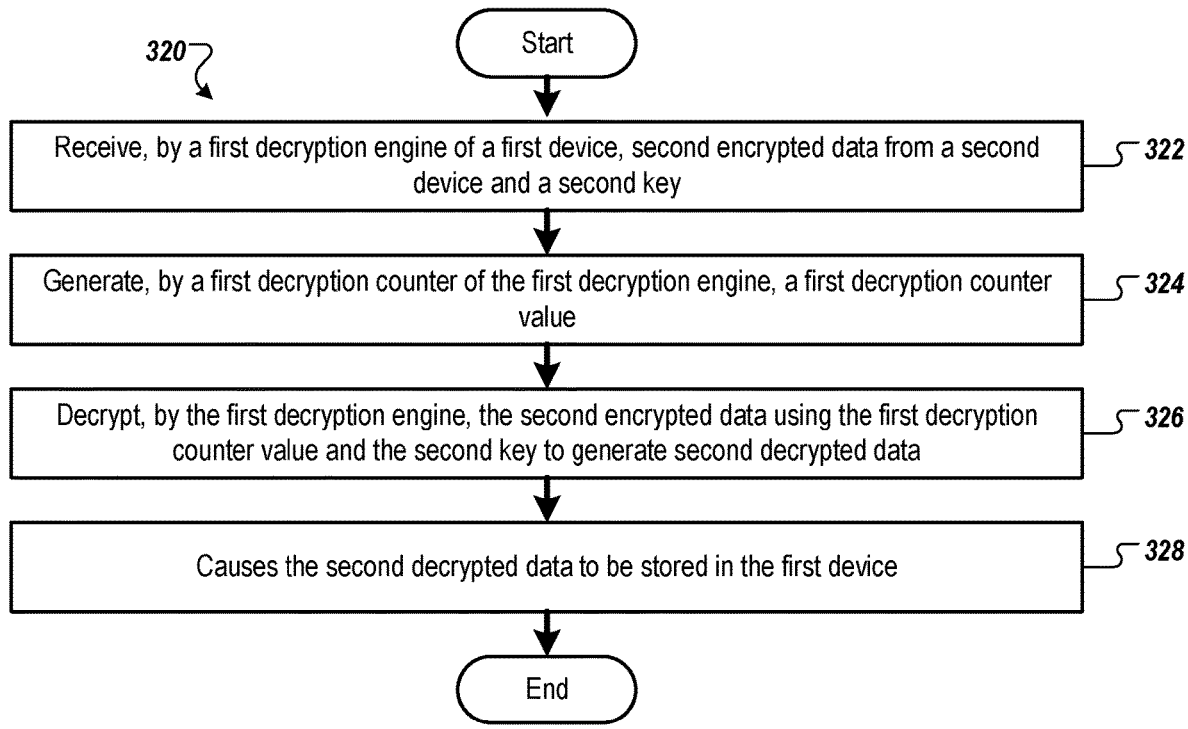

FIGS. 3A-3B are flow diagram of methods 300 and 320 of link protection, according to certain embodiments. Methods 300 and 320 may be performed by processing logic that is hardware (e.g., circuitry, dedicated logic, programmable logic, microcode, etc.). In one embodiment, methods 300 and 320 may be performed, in part, by link protection circuitry 112 of SoC 110 and/or link protection circuitry 122 of device 120.

For simplicity of explanation, the methods 300 and 320 are depicted and described as acts. However, acts in accordance with this disclosure can occur in various orders and/or concurrently and with other acts not presented and described herein. Furthermore, not all illustrated acts may be performed to implement the methods 300 and 320 in accordance with the disclosed subject matter. In addition, those skilled in the art will understand and appreciate that the methods 300 and 320 could alternatively be represented as interrelated states via a state diagram or events.

Referring to FIG. 3A, at block 302 of method 300, the processing logic receives, by a first encryption engine of a first device, first data and a first key. The processing logic may receive the first data from a processor, microcontroller, software, and/or firmware of the first device. The first data may be a write request, a read request, or a completion packet (e.g., read response to a read request, write response to a write request, etc.). The first data may be received by the processing logic to be transmitted to a second device.

The first key may be established during a cryptographic setup of the first device and the second device. In some embodiments, the first key may be specific for any transfers of data between the first device and the second device.

At block 304, processing logic generates, by a first encryption counter of the first encryption engine, a first encryption counter value. The values of the first encryption counter of the first device and the second decryption counter of the second device may be synchronized during the cryptographic setup of the first device and the second device. The first encryption counter of the first device and the second decryption counter of the second device may be specific to the type of data (e.g., first encryption write counter and second decryption write counter may be synchronized, first encryption read counter and second decryption read counter may be synchronized, etc.). The first encryption counter value may be specific for transfers of data from the encryption engine of the first device to the decryption engine of the second device. The first encryption counter value may be specific for transfer of a specific type of data (e.g., a write request, a read request, or a completion packet) between the first device and the second device.

At block 306, processing logic encrypts, by the first encryption engine, the first data using the first encryption counter value and the first key to generate first encrypted data. In some embodiments, the first encryption engine uses the key to encrypt and to generate a MAC on the transmit side. The MAC may be carried with the transaction. The MAC may protect the integrity of the transaction as the MAC moves along the link from the transmitter to the receiver. The MAC may be used to verify the authenticity of the transaction.

In some embodiments, the header insertion logic of the first device generates a trusted IO TLP (e.g., to carry the MAC) and adds the trusted IO TLP header to the first encrypted data to maintain order of the first encrypted data among instances of encrypted data transmitted by the first device. In some embodiments, the link protection circuitry (e.g., via encryption engine or header insertion logic) of the transmitter generates a MAC and the link protection circuitry (e.g., via decryption engine, via header parsing logic) of the receiver verifies the MAC to verify the authenticity of the transaction received.

At block 308, processing logic causes, by the first encryption engine, the first encrypted data to be transmitted (e.g., via a transmitter of the first device, via a root port of the first device) to a second device. The first encrypted data is to be decrypted by a second decryption engine of the second device using the first key and a second decryption counter value (e.g., of a second decryption engine of the second device) that is synchronized with the first encryption counter value.

In some embodiments, the processing logic, via drop detection logic, generates a ping write request to write a first value and a ping read request. Subsequent to a threshold amount of reads, the processing logic may transmit the ping write request to the device to write the first value to the second device (e.g., to a predetermined location of the second device). Subsequent to transmitting the ping write request, the processing logic may transmit the ping read request to the second device to read a second value (e.g., from the predetermined location of the second device, determine the second value via a completion packet received from the second device in response to the ping read request). Responsive to determining the first value and does not match the second value, the processing logic may detect a write attack (e.g., an unauthorized dropped write). Responsive to determining the first value matches the second value, the processing logic may determine that a write attack has not occurred.

In some embodiments, responsive to each write request transmitted by the first device, the processing logic, via drop detection logic, may increment a drop detection counter of the drop detection logic. Responsive to each read request transmitted by the first device, the processing logic, via the drop detection logic, may decrement the drop detection counter by a corresponding value in a corresponding read request. Responsive to determining a drop detection counter value of the drop detection counter is negative subsequent to a read request, the processing logic, via the drop detection counter, may detect a write attack. Responsive to determining the drop detection counter value is not negative, the processing logic, via the drop detection counter may determine that a write attack has not occurred.

Responsive to detecting the write attack, the processing logic may provide an interrupt (e.g., interrupt transmission of data between the first device and the second device, provide an alert to a user or administrator, etc.). Responsive to determining a write attack has not occurred (e.g., integrity of the link is maintained), the processing logic may allow transmission of data between the first and second devices to continue.

Referring to FIG. 3B, at block 322 of method 320, the processing logic receives, by a first decryption engine of a first device, second encrypted data from a second device and a second key (e.g., from a register or flop of the first device). In some embodiments, the second encryption data is second data that was encrypted by a second encryption engine of the second device using the second key and a second encryption counter value. The second data may be a read request (e.g., load request), write request (e.g., store request), or completion packet (e.g., read response to read request, write response to write request, etc.).

In some embodiments, the processing logic, via header parsing logic, may parse a trusted IO TLP header of the second encrypted data to verify integrity of the data (e.g., using the MAC carried in the IO TLP header). The header parsing logic may parse the trusted IO TLP header to identify a MAC carried by the trusted IO TLP header and the link protection circuitry (e.g., via the decryption engine) may verify authenticity of the second encrypted data by verifying the second MAC using the second key. The intermediate node 130 may maintain order of the second encrypted data among instances of encrypted data received from the second device based on the trusted IO TLP header. In some embodiments, the link protection circuitry (e.g., via encryption engine or header insertion logic) of the transmitter generates a MAC and the link protection circuitry (e.g., via decryption engine, via header parsing logic) of the receiver verifies the MAC to verify the authenticity of the transaction received.

At block 324, processing logic generates, by a first decryption counter of the first decryption engine, a first decryption counter value. The first decryption counter value is synchronized with the second encryption counter value of the second device.

At block 326, processing logic decrypts, by the first decryption engine, the second encrypted data using the first decryption counter value and the second key to generate second decrypted data. In some embodiments, the first decryption engine uses the second key to decrypt and to verify a MAC on the receiver side. The MAC may be carried with the transaction. The MAC may protect the integrity of the transaction as the MAC moves along the link from the transmitter to the receiver. The MAC may be used to verify the authenticity of the transaction.

At block 328, processing logic causes the second decrypted data to be stored in the first device (e.g., in fabric 117, in device memory 172, etc.). In some embodiments, the processing logic may provide a completion packet (e.g., response to the second encrypted data received) to the second device.

FIG. 4A is a block diagram illustrating a micro-architecture for a processor 400 coupled to link protection circuitry 112 or 122 for link protection, according to one embodiment. Specifically, processor 400 depicts an in-order architecture core and a register renaming logic, out-of-order issue/execution logic to be included in a processor according to at least one embodiment of the disclosure. In some embodiments, processor 400 is the processor 114 of FIG. 1A.

Processor 400 includes a front end unit 430 coupled to an execution engine unit 450, and both are coupled to a memory unit 470. The processor 400 may include a core 490 that is a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In another embodiment, the core 490 may have five stages.

The front end unit 430 includes a branch prediction unit 432 coupled to an instruction cache unit 434, which is coupled to an instruction translation lookaside buffer (TLP) unit 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware embodiments, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include TLB unit 472 coupled to a data cache unit (DCU) 474 coupled to a level 2 (L2) cache unit 476. In some embodiments DCU 474 may also be known as a first level data cache (L1 cache). The DCU 474 may handle multiple outstanding cache misses and continue to service incoming stores and loads. It also supports maintaining cache coherency. The TLB unit 472 may be used to improve virtual address translation speed by mapping virtual and physical address spaces. In one exemplary embodiment, the memory access units 464 may include a load unit, a store address unit, and a store data unit, each of which is coupled to the TLB unit 472 in the memory unit 470. The L2 cache unit 476 may be coupled to one or more other levels of cache and eventually to a main memory.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 4B is a block diagram illustrating an in-order pipeline and a register renaming stage, out-of-order issue/execution pipeline implemented by processor 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor 400 as a pipeline includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 420, and a commit stage 422. In some embodiments, the ordering of stages 402-422 may be different than illustrated and are not limited to the specific ordering shown in FIG. 4B.

Figure 5:
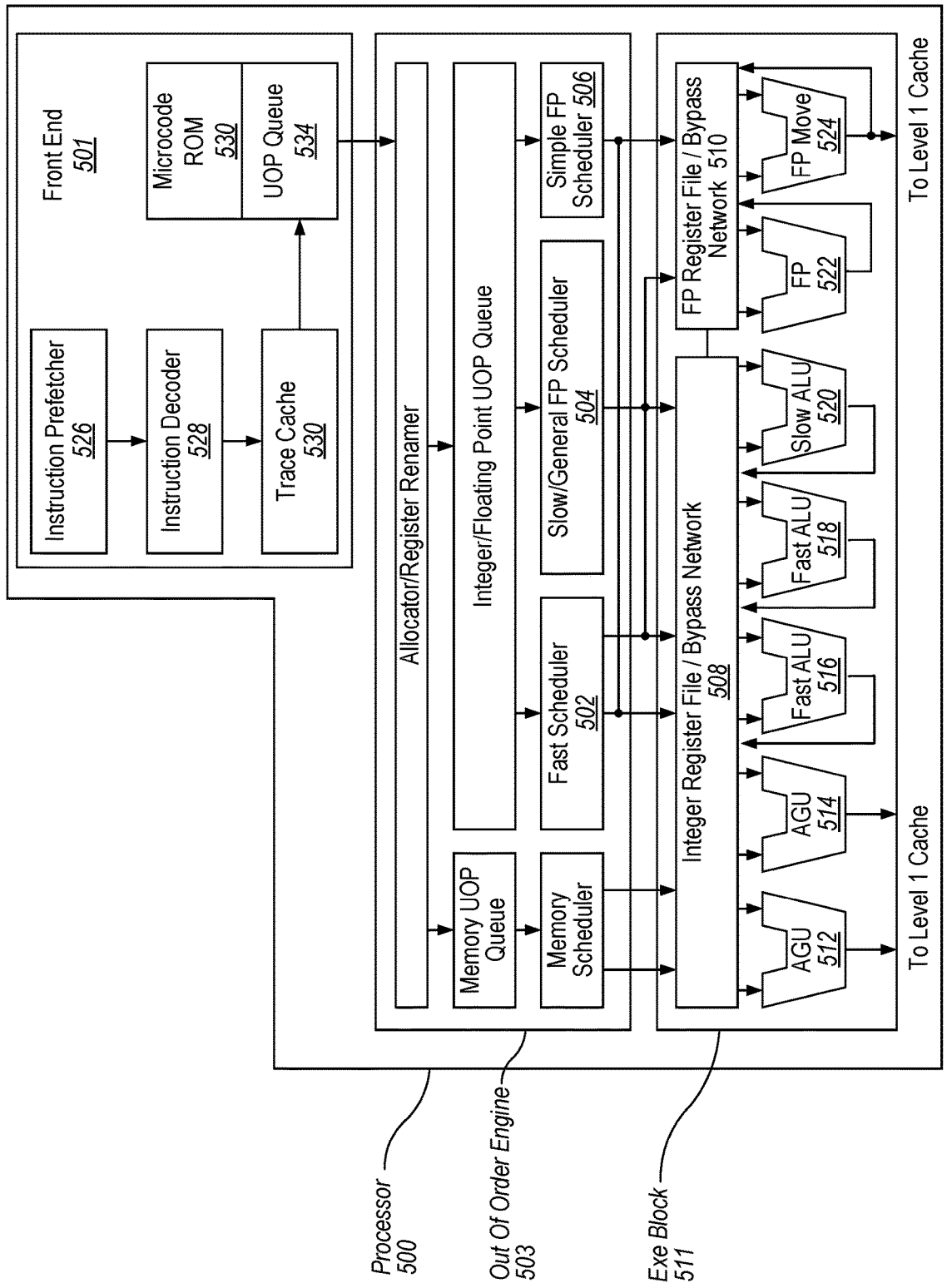
FIG. 5 illustrates a block diagram of the micro-architecture for a processor that performs link protection, according to one embodiment.

FIG. 5 illustrates a block diagram of the micro-architecture for a processor 500 coupled to link protection circuitry 112 or 122 for link protection, according to one embodiment. In some embodiments, processor 500 is the processor 114 of FIG. 1A.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is included of a number of execution units: address generation unit (AGU)

512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX™ registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
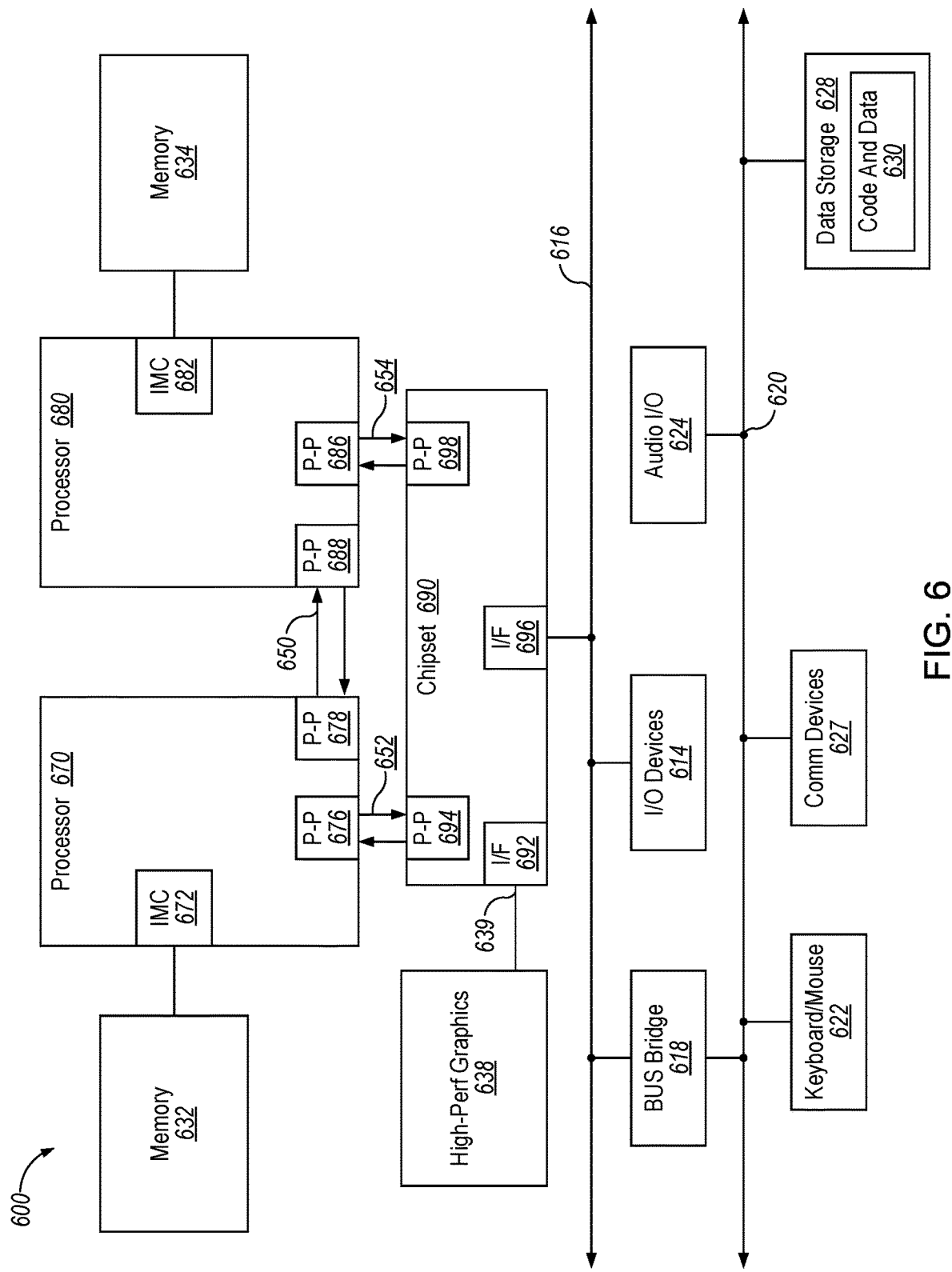
FIG. 6 is a block diagram of a computer system according to one embodiment.

Embodiments may be implemented in many different system types. Referring now to FIG. 6, shown is a block diagram of a multiprocessor system 600 in accordance with an embodiment. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Processor 670, processor 680, or both may be coupled to link protection circuitry 112 or 122 for link protection. In some embodiments, at least one of processor 670 or processor 680 is the processor 114 of FIG. 1A.

While shown with two processors 670, 680, it is to be understood that the scope of the present disclosure is not so limited. In other embodiments, one or more additional processors may be present in a given processor.

Processors 670 and 680 are shown including integrated I/O control logic ("CL") 672 and 682, respectively. Processor 670 also includes as part of its bus controller units point-to-point (P-P) interfaces 676 and 688; similarly, second processor 680 includes P-P interfaces 686 and 688. Processors 670, 680 may exchange information via a point-to-point (P-P) interface 650 using P-P interface circuits 678, 688. As shown in FIG. 6, CL 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
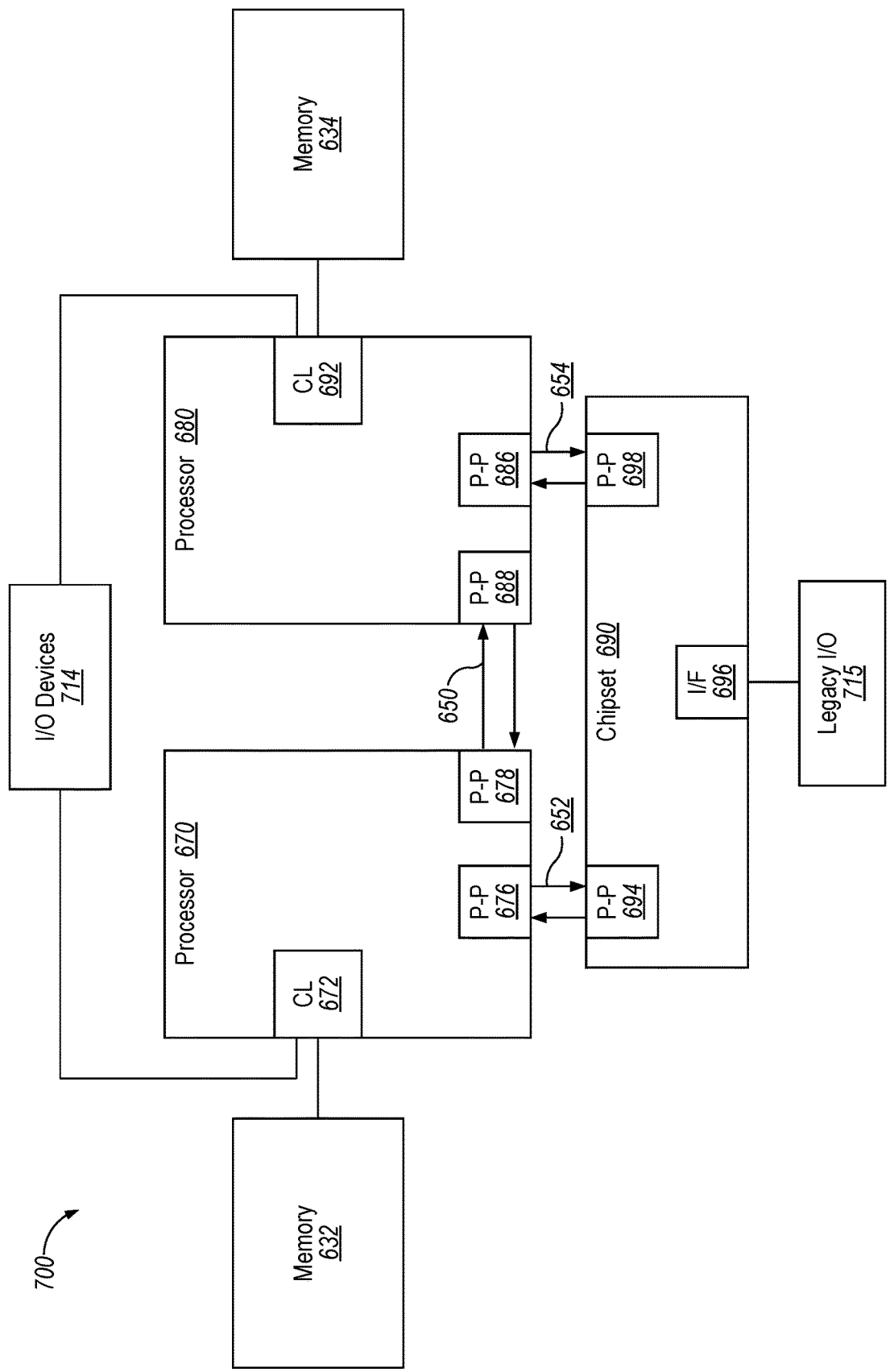
FIG. 7 is a block diagram of a computer system according to another embodiment.

Referring now to FIG. 7, shown is a block diagram of a third system 700 in accordance with an embodiment of the present disclosure. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. For at least one embodiment, the CL 672, 682 may include integrated memory controller units such as described herein. In addition, CL 672, 682 may also include I/O control logic. FIG. 7 illustrates that the memories 632, 634 are coupled to the CL 672, 682, and that I/O devices 714 are also coupled to the control logic 672, 682. Legacy I/O devices 715 are coupled to the chipset 690. Processor 670, processor 680, or both may be coupled to link protection circuitry 112 or 122 for link protection Processor 670 and/or processor 680 may be processor 114 of FIG. 1A.

Figure 8:
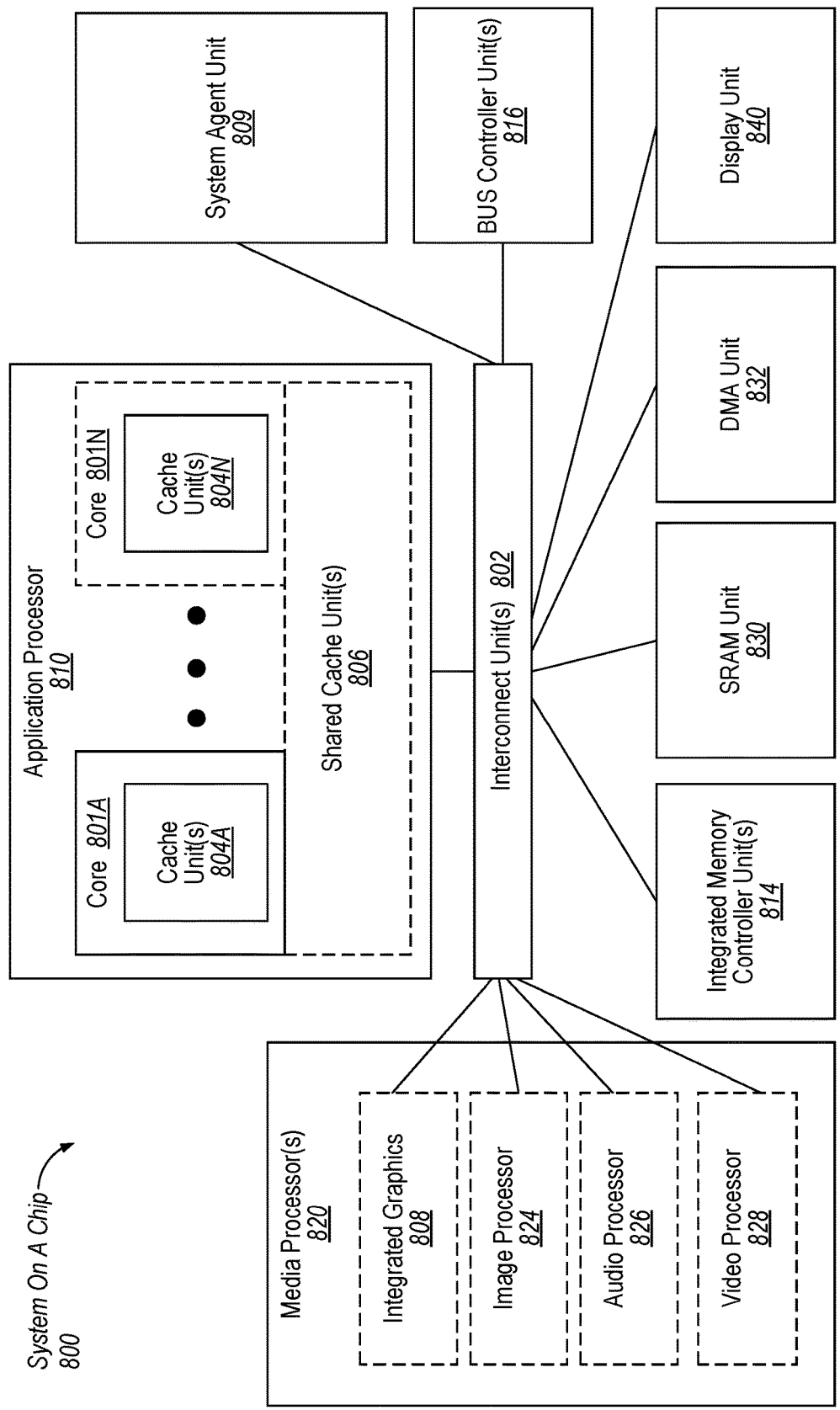
FIG. 8 is a block diagram of a system-on-a-chip according to one embodiment.

FIG. 8 is an exemplary SoC 800 that may include one or more of the cores 801. SoC 800 may include link protection circuitry 112 or 122 for link protection. In some embodiments, SoC 800 is SoC 110 of FIG. 1A. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a SoC 800 in accordance with an embodiment of the present disclosure. Also, dashed lined boxes are features on more advanced SoCs. In FIG. 8, an interconnect unit(s) 802 is coupled to: an application processor 810 which includes a set of one or more cores 801A-N and shared cache unit(s) 806; a system agent unit 809; a bus controller unit(s) 816; an integrated memory controller unit(s) 814; a set or one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays. The embodiments of the link protection circuitry 112 to provide link protection can be implemented in SoC 800. In some embodiments, processor 114 and memory 116 of FIG. 1A are fabricated on SoC 800. In some embodiments, device memory 172 if fabricated on SoC 800.

Figure 9:
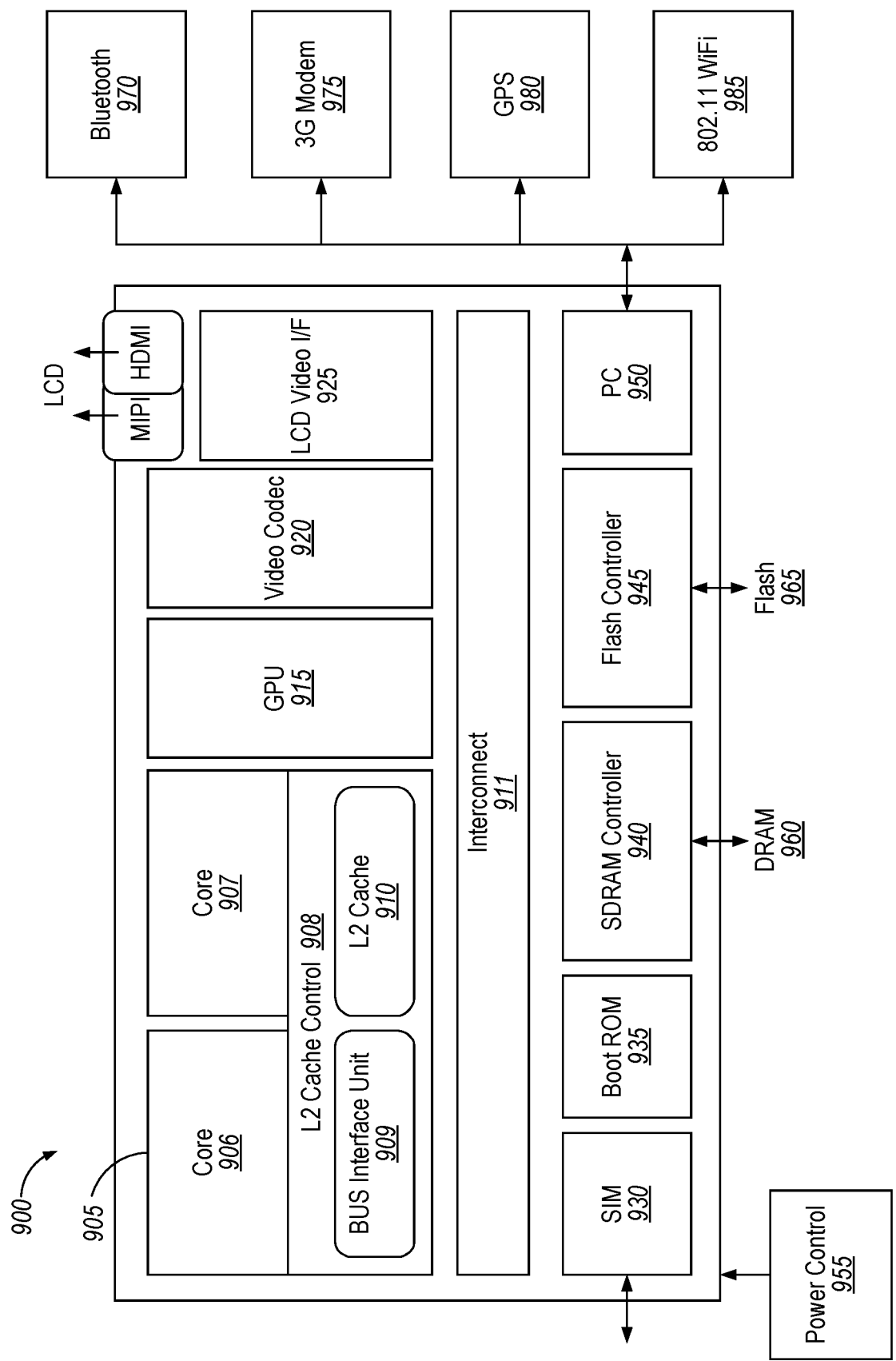
FIG. 9 illustrates another embodiment of a block diagram for a computing system.

Turning next to FIG. 9, an embodiment of a system on-chip (SoC) design in accordance with embodiments of the disclosure is depicted. As an illustrative example, SoC 900 is included in user equipment (UE). SoC 900 may include link protection circuitry 112 or 122 for link protection. In some embodiments, SoC 900 is SoC 110 of FIG. 1A. In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SoC 900 includes 2 cores-906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
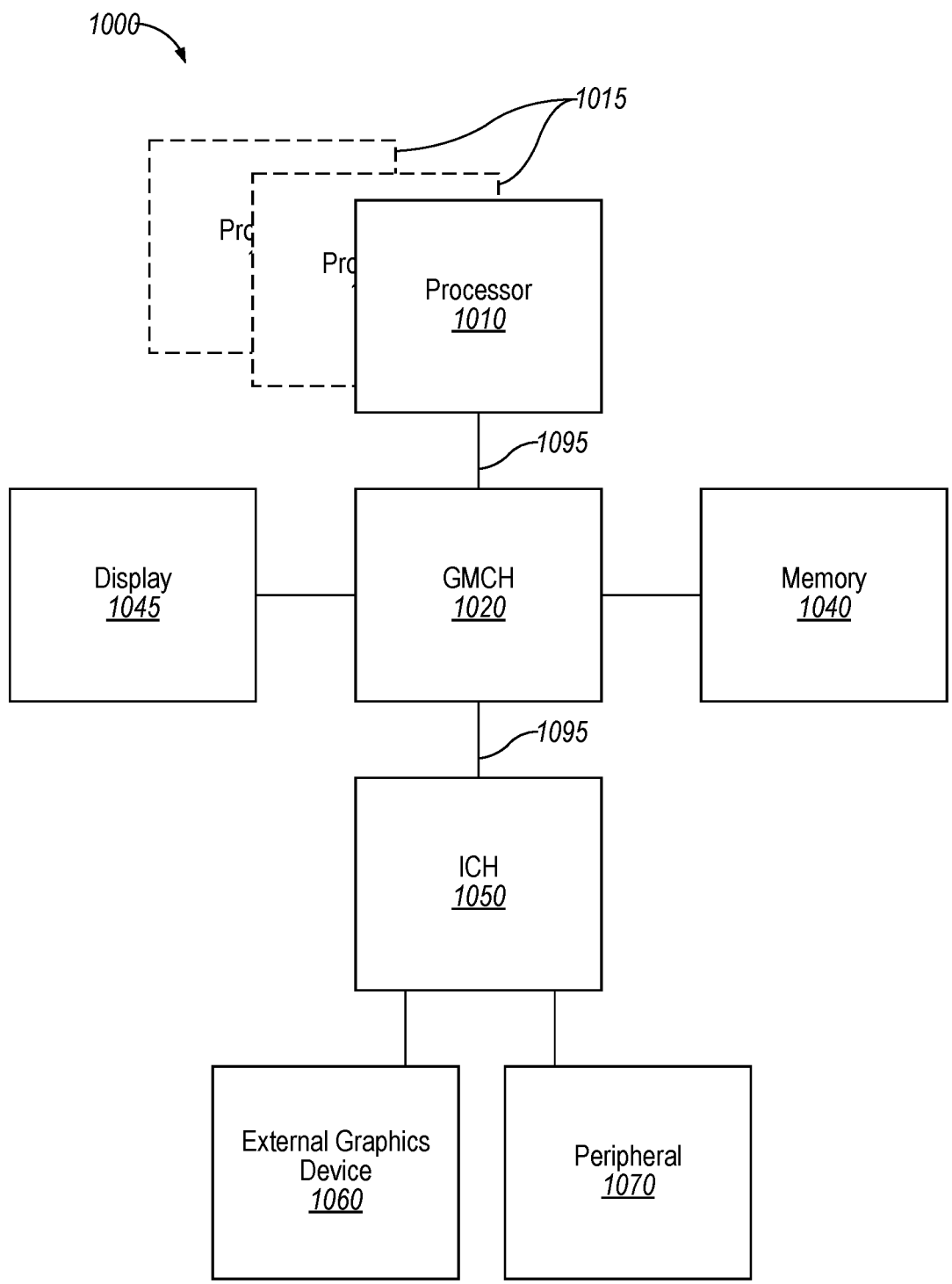
FIG. 10 illustrates a system in which an embodiment of the disclosure may operate.

Referring now to FIG. 10, shown is a block diagram of a system 1000 in which one embodiment of the disclosure may operate. The system 1000 may include one or more processors 1010, 1015, which are coupled to graphics memory controller hub (GMCH) 1020. One or more of processors 1010 and 1015, in various embodiments, is the same as processor 114 of FIG. 1A. One or more of GMCH 1020 or ICH 1050 may be an intermediate node 130 of FIG. 1A. One or more of memory 1040, display 1045, external graphics device 1060, or peripheral 1070 may be device 120 of FIG. 1A. The optional nature of additional processors 1015 is denoted in FIG. 10 with broken lines. In one embodiment, processors 1010, 1015 implement hybrid cores according to embodiments of the disclosure.

Each processor 1010, 1015 may be some version of the circuit, integrated circuit, processor, and/or silicon integrated circuit as described above. However, it should be noted that it is unlikely that integrated graphics logic and integrated memory control units would exist in the processors 1010, 1015. FIG. 10 illustrates that the GMCH 1020 may be coupled to a memory 1040 that may be, for example, a dynamic random access memory (DRAM). The DRAM may, for at least one embodiment, be associated with a non-volatile cache.

The GMCH 1020 may be a chipset, or a portion of a chipset. The GMCH 1020 may communicate with the processor(s) 1010, 1015 and control interaction between the processor(s) 1010, 1015 and memory 1040. The GMCH 1020 may also act as an accelerated bus interface between the processor(s) 1010, 1015 and other elements of the system 1000. For at least one embodiment, the GMCH 1020 communicates with the processor(s) 1010, 1015 via a multi-drop bus, such as a frontside bus (FSB) 1095.

Furthermore, GMCH 1020 is coupled to a display 1045 (such as a flat panel or touchscreen display). GMCH 1020 may include an integrated graphics accelerator. GMCH 1020 is further coupled to an input/output (I/O) controller hub (ICH) 1050, which may be used to couple various peripheral devices to system 1000. Shown for example in the embodiment of FIG. 10 is an external graphics device 1060, which may be a discrete graphics device, coupled to ICH 1050, along with another peripheral device 1070.

Alternatively, additional or different processors may also be present in the system 1000. For example, additional processor(s) 1015 may include additional processors(s) that are the same as processor 1010, additional processor(s) that are heterogeneous or asymmetric to processor 1010, accelerators (such as, e.g., graphics accelerators or digital signal processing (DSP) units), field programmable gate arrays, or any other processor. There can be a variety of differences between the processor(s) 1010, 1015 in terms of a spectrum of metrics of merit including architectural, micro-architectural, thermal, power consumption characteristics, and the like. These differences may effectively manifest themselves as asymmetry and heterogeneity amongst the processors 1010, 1015. For at least one embodiment, the various processors 1010, 1015 may reside in the same die package.

Figure 11:
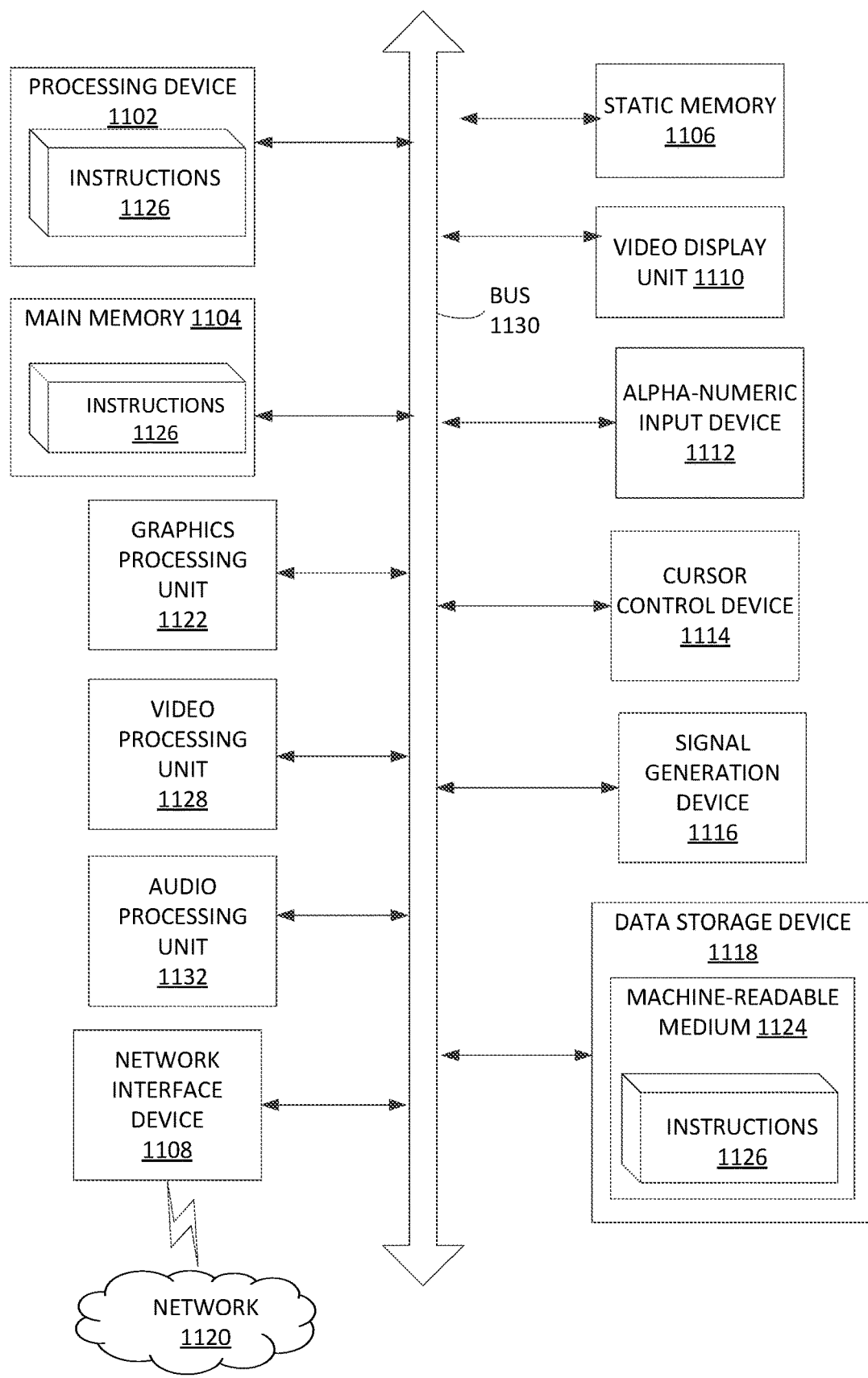
FIG. 11 illustrates another embodiment of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The link protection circuitry 112 or 122 that provides link protection can be implemented in computing system 1100.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.) (e.g., memory 116 of FIG. 1A, device memory 172 of FIG. 1B), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores. The processing device 1102 is configured to execute the instructions 1126 (e.g., processing logic) for performing the operations discussed herein. In one embodiment, processing device 1102 is coupled to link protection circuitry 112 or 122 of FIG. 1A. In another embodiment, processing device 1102 is processor 114 of FIG. 1A. Alternatively, the computing system 1100 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored instructions 1126 (e.g., software) embodying any one or more of the methodologies of functions described herein. The instructions 1126 (e.g., software) may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media. Main memory 1104 may be memory 116 of FIG. 1A or device memory 172 of FIG. 1B.

The computer-readable storage medium 1124 may also be used to store instructions 1126 utilizing the processing device 1102 and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a system on a chip (SoC) comprising: a processor; memory coupled to the processor; link protection circuitry coupled to the memory, the link protection circuitry comprising an SoC encryption engine to: receive first data from the memory and a first key; generate, by an SoC encryption counter of the SoC encryption engine, an SoC encryption counter value; encrypt the first data using the SoC encryption counter value and the first key to generate first encrypted data; and cause the first encrypted data to be transmitted to a device comprising a device decryption counter synchronized with the SoC encryption counter.

In Example 2, the subject matter of Example 1, wherein the first encrypted data is to be decrypted by a device decryption engine of the device using the first key and a device decryption counter value that is synchronized with the SoC encryption counter value, the device decryption counter value generated by the device decryption counter.

In Example 3, the subject matter of any one of Examples 1-2, wherein the first encrypted data is transmitted from the SoC to the device via an intermediate node without verifying integrity of the first encrypted data at the intermediate node.

In Example 4, the subject matter of any one of Examples 1-3, wherein the link protection circuitry is to generate a first message authentication code (MAC) using the first key, and wherein the link protection circuitry further comprises: header insertion logic to: generate a trusted input/output (IO) transaction layer packet (TLP) header to carry the first MAC to the device for verifying authenticity of the first encrypted data; and add the trusted IO TLP header to the first encrypted data to maintain order of the first encrypted data among instances of encrypted data transmitted by the SoC.

In Example 5, the subject matter of any one of Examples 1-4, wherein the link protection circuitry further comprises: an SoC decryption engine to: receive a second key and second encrypted data encrypted by a device encryption engine of the device using the second key and a device encryption counter value; generate, using an SoC decryption counter of the SoC decryption engine, an SoC decryption counter value that is synchronized with the device encryption counter value; and decrypt the second encrypted data using the SoC decryption counter value and the second key to generate second decrypted data.

In Example 6, the subject matter of any one of Examples 1-5, wherein the link protection circuitry further comprises: header parsing logic to: parse a trusted input/output (IO) transaction layer packet (TLP) header of the second encrypted data to identify a second MAC carried by the trusted IO TLP header, wherein the link protection circuitry is to verify authenticity of the second encrypted data by verifying the second MAC using the second key.

In Example 7, the subject matter of any one of Examples 1-6, wherein the link protection circuitry further comprises: drop detection logic to: generate a ping write request to write a first value and a ping read request; subsequent to a threshold amount of reads, transmit the ping write request to the device to write the first value to the device; subsequent to transmitting the ping write request, transmit the ping read request to the device to read a second value; and responsive to determining the first value does not match the second value, detect a write attack.

In Example 8, the subject matter of any one of Examples 1-7, wherein the link protection circuitry further comprises: drop detection logic to: responsive to each write request transmitted by the SoC, increment a first drop detection counter of a first drop detection logic; responsive to each read request transmitted by the SoC, decrement the first drop detection counter by a corresponding value in a corresponding read request; and responsive to determining a drop detection counter value of the first drop detection counter is negative subsequent to a first read request, detect a write attack.

In Example 9, the subject matter of any one of Examples 1-8, wherein the first data is a load request, a store request, or a completion packet.

Example 10 is a first device comprising: link protection circuitry comprising: a first encryption engine to: receive first data and a first key; generate, by a first encryption counter of the first encryption engine, a first encryption counter value; encrypt the first data using the first encryption counter value and the first key to generate first encrypted data; and cause the first encrypted data to be transmitted to a second device comprising a second decryption counter synchronized with the first encryption counter.

In Example 11, the subject matter of Example 10, wherein the first encrypted data is to be decrypted by a second decryption engine of the second device using the first key and a second decryption counter value that is synchronized with the first encryption counter value, the second decryption counter value generated by the second decryption counter.

In Example 12, the subject matter of any one of Examples 10-11, wherein the first encrypted data is transmitted from the first device to the second device via an intermediate node without verifying integrity of the first encrypted data at the intermediate node.

In Example 13, the subject matter of any one of Examples 10-12, wherein the link protection circuitry is to generate a first message authentication code (MAC) using the first key, and wherein the link protection circuitry further comprises: header insertion logic to: generate a trusted input/output (IO) transaction layer packet (TLP) header to carry the first MAC to the device for verifying authenticity of the first encrypted data; and add the trusted IO TLP header to the first encrypted data to maintain order of the first encrypted data among instances of encrypted data transmitted by the first device.

In Example 14, the subject matter of any one of Examples 10-13, wherein the link protection circuitry further comprises: a first decryption engine to: receive a second key and second encrypted data encrypted by a second encryption engine of the second device using the second key and a second encryption counter value; generate, using a first decryption counter of the first decryption engine, a first decryption counter value that is synchronized with the second encryption counter value; and decrypt the second encrypted data using the first decryption counter value and the second key to generate second decrypted data.

In Example 15, the subject matter of any one of Examples 10-14, wherein the link protection circuitry further comprises: header parsing logic to: parse a trusted input/output (IO) transaction layer packet (TLP) header of the second encrypted data to identify a second MAC carried by the trusted IO TLP header, wherein the link protection circuitry is to verify authenticity of the second encrypted data by verifying the second MAC using the second key.

In Example 16, the subject matter of any one of Examples 10-15, wherein the link protection circuitry further comprises: drop detection logic to: generate a ping write request to write a first value and a ping read request; subsequent to a threshold amount of reads, transmit the ping write request to the second device to write the first value to the second device; subsequent to transmitting the ping write request, transmit the ping read request to the second device to read a second value; and responsive to determining the first value does not match the second value, detect a write attack.

In Example 17, the subject matter of any one of Examples 10-16, wherein the link protection circuitry further comprises: drop detection logic to: responsive to each write request transmitted by the first device, increment a first drop detection counter of a first drop detection logic; responsive to each read request transmitted by the first device, decrement the first drop detection counter by a corresponding value in a corresponding read request; and responsive to determining a drop detection counter value of the first drop detection counter is negative subsequent to a first read request, detect a write attack.

Example 18 is a method comprising: receiving, by a first encryption engine of a first device, first data and a first key; generating, by a first encryption counter of the first encryption engine, a first encryption counter value; encrypting, by the first encryption engine, the first data using the first encryption counter value and the first key to generate first encrypted data; and causing, by the first encryption engine, the first encrypted data to be transmitted to a second device comprising a second decryption counter synchronized with the first encryption counter.

In Example 19, the subject matter of Example 18, wherein: the first encrypted data is to be decrypted by a second decryption engine of the second device using the first key and a second decryption counter value that is synchronized with the first encryption counter value, the second decryption counter value generated by the second decryption counter; and the first encrypted data is transmitted from the first device to the second device via an intermediate node without verifying integrity of the first encrypted data at the intermediate node.

In Example 20, the subject matter of any one of Examples 18-19, further comprising: receiving, by a first decryption engine, a second key and second encrypted data encrypted by a second encryption engine of the second device using the second key and a second encryption counter value; generating, using a first decryption counter of the first decryption engine, a first decryption counter value that is synchronized with the second encryption counter value; and decrypting, by the first decryption engine, the second encrypted data using the first decryption counter value and the second key to generate second decrypted data.

Example 21 is an apparatus comprising means to perform a method of any one of Examples 18-20.

Example 22 is at least one machine readable medium comprising a plurality of instructions, when executed, to implement a method or realize an apparatus of any one of Examples 18-20.

Example 23 is an apparatus comprising logic configured to perform the method of any one of Examples 18-20.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "encrypting," "causing," "adding," "decrypting," "parsing," "maintaining," "detecting," "transmitting," "incrementing," "decrement," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system on a chip (SoC) comprising:
a processor;
memory coupled to the processor;
link protection circuitry coupled to the memory, the link protection circuitry comprising an SoC encryption engine to:
receive first data from the memory and a first key;
generate, by an SoC encryption counter of the SoC encryption engine, an SoC encryption counter value;
encrypt the first data using the SoC encryption counter value and the first key to generate first encrypted data; and
cause the first encrypted data to be transmitted to a device comprising a device decryption counter synchronized with the SoC encryption counter, wherein the first encrypted data is transmitted to the device via an intermediate node without verifying integrity of the first encrypted data at the intermediate node.

2. The SoC of claim 1, wherein the first encrypted data is to be decrypted by a device decryption engine of the device using the first key and a device decryption counter value that is synchronized with the SoC encryption counter value, the device decryption counter value generated by the device decryption counter.

3. The SoC of claim 1, wherein the link protection circuitry is to generate a first message authentication code (MAC) using the first key, and wherein the link protection circuitry further comprises:
header insertion logic to:
generate a trusted input/output (TO) transaction layer packet (TLP) header to carry the first MAC to the device for verifying authenticity of the first encrypted data; and
add the trusted IO TLP header to the first encrypted data to maintain order of the first encrypted data among instances of encrypted data transmitted by the SoC.

4. The SoC of claim 1, wherein the link protection circuitry further comprises:
an SoC decryption engine to:
receive a second key and second encrypted data encrypted by a device encryption engine of the device using the second key and a device encryption counter value;
generate, using an SoC decryption counter of the SoC decryption engine, an SoC decryption counter value that is synchronized with the device encryption counter value; and
decrypt the second encrypted data using the SoC decryption counter value and the second key to generate second decrypted data.

5. The SoC of claim 4, wherein the link protection circuitry further comprises:
header parsing logic to:
parse a trusted input/output (TO) transaction layer packet (TLP) header of the second encrypted data to identify a second MAC carried by the trusted IO TLP header, wherein the link protection circuitry is to verify authenticity of the second encrypted data by verifying the second MAC using the second key.

6. The SoC of claim 1, wherein the link protection circuitry further comprises:
drop detection logic to:
generate a ping write request to write a first value and a ping read request;
subsequent to a threshold amount of reads, transmit the ping write request to the device to write the first value to the device;
subsequent to transmitting the ping write request, transmit the ping read request to the device to read a second value; and
responsive to determining the first value does not match the second value, detect a write attack.

7. The SoC of claim 1, wherein the link protection circuitry further comprises:
drop detection logic to:
responsive to each write request transmitted by the SoC, increment a first drop detection counter of a first drop detection logic;
responsive to each read request transmitted by the SoC, decrement the first drop detection counter by a corresponding value in a corresponding read request; and
responsive to determining a drop detection counter value of the first drop detection counter is negative subsequent to a first read request, detect a write attack.

8. The SoC of claim 1, wherein the first data is a load request, a store request, or a completion packet.

9. A first device comprising:
link protection circuitry comprising:
a first encryption engine to:
receive first data and a first key;
generate, by a first encryption counter of the first encryption engine, a first encryption counter value;
encrypt the first data using the first encryption counter value and the first key to generate first encrypted data; and
cause the first encrypted data to be transmitted to a second device comprising a second decryption counter synchronized with the first encryption counter, wherein the first encrypted data is transmitted to the second device via an intermediate node without verifying integrity of the first encrypted data at the intermediate node.

10. The first device of claim 9, wherein the first encrypted data is to be decrypted by a second decryption engine of the second device using the first key and a second decryption counter value that is synchronized with the first encryption counter value, the second decryption counter value generated by the second decryption counter.

11. The first device of claim 9, wherein the link protection circuitry is to generate a first message authentication code (MAC) using the first key, and wherein the link protection circuitry further comprises:
header insertion logic to:
generate a trusted input/output (TO) transaction layer packet (TLP) header to carry the first MAC to the device for verifying authenticity of the first encrypted data; and
add the trusted TO TLP header to the first encrypted data to maintain order of the first encrypted data among instances of encrypted data transmitted by the first device.

12. The first device of claim 9, wherein the link protection circuitry further comprises:

a first decryption engine to:
  receive a second key and second encrypted data encrypted by a second encryption engine of the second device using the second key and a second encryption counter value;
  generate, using a first decryption counter of the first decryption engine, a first decryption counter value that is synchronized with the second encryption counter value; and
  decrypt the second encrypted data using the first decryption counter value and the second key to generate second decrypted data.

13. The first device of claim 12, wherein the link protection circuitry further comprises:
  header parsing logic to:
    parse a trusted input/output (TO) transaction layer packet (TLP) header of the second encrypted data to identify a second MAC carried by the trusted TO TLP header, wherein the link protection circuitry is to verify authenticity of the second encrypted data by verifying the second MAC using the second key.

14. The first device of claim 9, wherein the link protection circuitry further comprises:
  drop detection logic to:
    generate a ping write request to write a first value and a ping read request;
    subsequent to a threshold amount of reads, transmit the ping write request to the second device to write the first value to the second device;
    subsequent to transmitting the ping write request, transmit the ping read request to the second device to read a second value; and
    responsive to determining the first value does not match the second value, detect a write attack.

15. The first device of claim 9, wherein the link protection circuitry further comprises:
  drop detection logic to:
    responsive to each write request transmitted by the first device, increment a first drop detection counter of a first drop detection logic;
    responsive to each read request transmitted by the first device, decrement the first drop detection counter by a corresponding value in a corresponding read request; and
    responsive to determining a drop detection counter value of the first drop detection counter is negative subsequent to a first read request, detect a write attack.

16. A method comprising:
  receiving, by a first encryption engine of a first device, first data and a first key;
  generating, by a first encryption counter of the first encryption engine, a first encryption counter value;
  encrypting, by the first encryption engine, the first data using the first encryption counter value and the first key to generate first encrypted data; and
  causing, by the first encryption engine, the first encrypted data to be transmitted to a second device comprising a second decryption counter synchronized with the first encryption counter, wherein the first encrypted data is transmitted to the second device via an intermediate node without verifying integrity of the first encrypted data at the intermediate node.

17. The method of claim 16, wherein the first encrypted data is to be decrypted by a second decryption engine of the second device using the first key and a second decryption counter value that is synchronized with the first encryption counter value, the second decryption counter value generated by the second decryption counter.

18. The method of claim 16 further comprising:
  receiving, by a first decryption engine, a second key and second encrypted data encrypted by a second encryption engine of the second device using the second key and a second encryption counter value;
  generating, using a first decryption counter of the first decryption engine, a first decryption counter value that is synchronized with the second encryption counter value; and
  decrypting, by the first decryption engine, the second encrypted data using the first decryption counter value and the second key to generate second decrypted data.

* * * * *